United States Patent
Takeuchi et al.

[11] Patent Number: 6,108,062
[45] Date of Patent: Aug. 22, 2000

[54] POLYMER DISPERSION-TYPE LIQUID CRYSTAL OPTICAL DEVICE AND METHOD FOR PRODUCING THE SAME

[75] Inventors: Satoshi Takeuchi; Masayuki Ando; Tatsuya Tabei; Tadafumi Shindo; Hiroki Maeda; Hideshi Hattori; Kei Ikegami, all of Tokyo, Japan

[73] Assignee: Dai Nippon Printing Co., Ltd., Japan

[21] Appl. No.: 09/149,308

[22] Filed: Jan. 27, 1998

Related U.S. Application Data

[60] Division of application No. 08/339,748, Nov. 15, 1994, Pat. No. 5,843,332, which is a continuation-in-part of application No. 07/961,168, Oct. 16, 1992, Pat. No. 5,479,278.

[30] Foreign Application Priority Data

Oct. 21, 1991 [JP] Japan ................................. 3-299546
Jul. 9, 1992 [JP] Japan ................................. 4-204262

[51] Int. Cl.⁷ .................................................. G02F 1/1333
[52] U.S. Cl. .................................. 349/88; 349/92; 349/89
[58] Field of Search .................................. 349/88, 89, 92

[56] References Cited

U.S. PATENT DOCUMENTS

| | | | |
|---|---|---|---|
| 4,022,706 | 5/1977 | Davis | 359/105 |
| 4,709,990 | 12/1987 | Oana | 359/52 |
| 4,783,150 | 11/1988 | Tabony | 359/103 |
| 4,884,873 | 12/1989 | Fergason | 359/98 |
| 4,925,708 | 5/1990 | Waters et al. | 428/1 |
| 5,018,840 | 5/1991 | Ogawa | 359/51 |
| 5,085,973 | 2/1992 | Shimizu et al. | 430/271 |
| 5,087,387 | 2/1992 | Mullen et al. | 359/103 |
| 5,095,379 | 3/1992 | Fukunaga et al. | 359/68 |
| 5,143,783 | 9/1992 | Shimizu et al. | 428/327 |
| 5,185,074 | 2/1993 | Yokoyama et al. | 205/162 |
| 5,198,148 | 3/1993 | Nakano | 252/299.01 |
| 5,202,063 | 4/1993 | Andrews et al. | 559/52 |
| 5,270,843 | 12/1993 | Wang | 359/51 |
| 5,274,481 | 12/1993 | Kim | 359/51 |
| 5,328,580 | 7/1994 | Reamey | 205/122 |
| 5,427,713 | 6/1995 | Wartenberg et al. | 252/299.5 |
| 5,462,822 | 10/1995 | Roosen et al. | 430/7 |
| 5,479,278 | 12/1995 | Takeuchi et al. | 359/52 |
| 5,484,552 | 1/1996 | Wartenberg et al. | 252/299.5 |
| 5,496,497 | 3/1996 | Takiguchi et al. | 252/299.01 |
| 5,498,450 | 3/1996 | Akashi et al. | 428/1 |
| 5,516,455 | 5/1996 | Jacobine et al. | 252/299.01 |
| 5,891,152 | 1/1990 | Miller et al. | 359/103 |
| 5,916,735 | 6/1999 | Nakashima et al. | 430/314 |
| 5,932,137 | 8/1999 | Baba et al. | 252/299.66 |

FOREIGN PATENT DOCUMENTS 4179918  6/1992  Japan .

*Primary Examiner*—C. H. Kelly
*Attorney, Agent, or Firm*—Parkhurst & Wendel, L.L.P

[57] ABSTRACT

A liquid crystal optical device including a liquid crystal/polymer composite film including of a matrix polymer composed mainly of a transparent resin having an ionic dissociative group and, dispersed therein, a liquid crystal particle; and conductive substrates sandwiching the liquid crystal/polymer composite film therebetween, at least one of the conductive substrates being transparent. A method for producing the liquid crystal optical device according to the present invention includes the steps of dispersing a liquid crystal in a dispersion medium composed mainly of water to prepare an oil-in-water type emulsion; preparing a composition for electrodeposition through the use of the resultant emulsion and a resin for a matrix polymer; electrodepositing the composition for electrodeposition on a conductive base material to form an electrodeposited coating; and drying the electrodeposited coating to form on the conductive base material a liquid crystal/polymer composite film including a matrix polymer and, dispersed therein, a liquid crystal particle.

2 Claims, 7 Drawing Sheets

POLYMER DISPERSION-TYPE LIQUID CRYSTAL OPTICAL DEVICE AND METHOD FOR PRODUCING THE SAME

This is a Division of application Ser. No. 08/339,748 filed Nov. 15, 1994 now U.S. Pat. No. 5,834,332, which in turn is a CIP of application Ser. No. 07/961,168 U.S. Pat. No. 5,479,278 issued Dec. 26, 1995.

BACKGROUND ART

The present invention relates to a polymer dispersion-type liquid crystal optical device which utilizes a change in the phase between light transmission and light scattering (light absorption). More particularly, the present invention is concerned with a liquid crystal optical device which exhibits excellent display characteristics such as a high contrast, a low driving voltage and sharpness, and a method for producing the same.

In general, a liquid crystal display has hitherto found a wide range of applications in wristwatchs, desk top computers, personal computers, television sets, etc. as display medium for a letter and an image by virtue of its features such as low power consumption, light weight and small thickness. In general TN- and STN-liquid displays, a liquid crystal is sealed into a liquid crystal cell comprising two sheets of transparent conductive glass substrates having an oriented film applied thereto and a predetermined seal provided between the substrates, and the assembly is further sandwiched between polarizing plates.

The above-described liquid crystal displays, however, have problems including that (1) the angle of visibility is small due to the necessity of two polarizing plates and a back light having a high power consumption is necessary due to lack of brightness, (2) the dependency upon the cell thickness is so large that it is difficult to increase the area of the display, and (3) the production cost is high because sealing of a liquid crystal into the cell is difficult due to a complicated structure, which limits a reduction in weight, a reduction in thickness, an increase in area, a lowering in power consumption and a lowering in cost of the liquid crystal display.

A great expectation on a polymer dispersion-type liquid crystal display which utilizes a liquid crystal/polymer composite file comprising a polymer matrix and, dispersed therein, a liquid crystal was placed as a liquid crystal optical device for solving the above described problem, and research and development of the polymer dispersion-type liquid crystal display has become eager in the art.

Such a liquid crystal/polymer composite film is mainly produced by the following methods.

(1) A method wherein a porous polymer is impregnated with a liquid crystal.

(2) A method wherein an emulsion prepared by dispersing a liquid crystal in an aqueous solution of polyvinyl alcohol is cast and dried (see International Publication No. WO83/01016).

(3) A method wherein a solution of a liquid crystal and a polymer dissolved in a common solvent is cast and a phase separation of the liquid crystal and the polymer is conducted accompanying the removal of the solvent (see International Publication No. WO85/04262).

(4) A method wherein the monomer in a mixture of a liquid crystal with a monomer is polymerized to provide a phase separation structure of the liquid crystal and the polymer (see International Publication No. WO85/04262).

Among the above-described methods, the method (2) has advantages that the production of the composite film is simple, the structure and film thickness are easy to control and an increase in the area is possible, and this method has been already put to practical use for the production of a light-controllable glass etc.

As shown in FIG. 1, in the liquid crystal/polymer composite film produced by the method (2), the liquid crystal is dispersed as a micro droplet into a matrix resin. When no voltage is applied to the composite film, the liquid crystal molecules are arranged along a spherical wall of the matrix as shown in FIG. 1A and incident light is scattered at the inside and interface of the liquid crystal droplet due to a birefringence property of the liquid crystal molecule. This causes the liquid crystal/polymer composite film to become opaque.

The application of a voltage causes liquid crystal molecules to align in the direction of an electric field as shown in FIG. 1B, so that incident light travels straight to cause the liquid crystal/polymer composite film to become transparent.

The voltage necessary for aligning the liquid crystal molecules in the direction of an electric field depends upon the diameter of the liquid crystal droplet. Specifically, the constraining force which the liquid crystal droplet receives from an outer wall becomes relatively strong with a reduction in the size of the liquid crystal droplet, so that a higher electric field is necessary to align the liquid crystal in the direction of an electric field. For this reason, when a large liquid crystal droplet and a small liquid crystal droplet co-exist in the liquid crystal/polymer composite film, a curve showing a change in the parallel ray transmission with the voltage becomes gentle. On the other hand, when the diameter of the liquid crystal droplet is homogeneous, the application of a voltage gives rise to a sharp change in the parallel ray transmission.

The capability of the liquid crystal droplet to scatter incident light with no voltage being applied depends upon the diameter of the liquid crystal droplet. This ability is related to the relationship between the wavelength of light and the size of the liquid crystal droplet and the number of the interfaces of liquid crystal/resin. No satisfactory light scattering capability can be obtained when the size of the liquid crystal droplet is excessively large or small. Therefore, in order to simultaneously realize a high contrast, a low driving voltage and a high sharpness, it is necessary to conduct optimization through homogenization of the diameter of the liquid crystal droplet.

The diameter of the liquid crystal droplet in the liquid crystal/polymer composite film is determined by the diameter of the liquid crystal particle in the emulsion to be cast. Therefore, in the liquid crystal/polymer composite film as well, in order to control the diameter of the liquid crystal droplet, it is necessary to control the diameter of the liquid crystal particle in the emulsion.

According to a conventional method wherein an emulsion comprising a liquid crystal dispersed in an aqueous polyvinyl alcohol (PVA) solution is cast and dried, it is a matter of course that a phase separation structure comprising a matrix polymer of PVA and, dispersed therein, a liquid crystal particle is formed. Since, however, the transparency of PVA is so poor that a visual light transmission exceeding 70% cannot be attained (see Koh-ichi Nagano et al., "Poval", p. 378, Kobunshi Kankokai, 1981). When a cast film is prepared from an aqueous PVA solution, since it is very difficult to dry the film, the electrical insulation is low although it depends upon the production conditions, and it is generally said that the resistivity is about $10^7$ to $10^9$ Ω·cm (see Tadahiro Miwa, "Gosei Jushi no Kagaku", p. 105, Gihodo, 1975). Further, with respect to the weatherability as well, the PVA is inferior to an acrylic polymer.

Thus, the liquid crystal/polymer composite film prepared according to the conventional method has problems of optical characteristics, electrical characteristics and durability.

The liquid crystal emulsion has hitherto been prepared by a mechanical emulsification method wherein use was made of a high-speed agitator and an emulsification method wherein use was made of an ultrasonic homogenizer. In these methods, however, it was difficult to narrow the particle diameter distribution of the dispersed liquid crystal. For this reason, the conventional liquid crystal/polymer composite film has a drawback that it needs a high driving voltage and is poor in sharpness. This drawback has bean an obstacle to a reduction in the cost of the display and the realization of multiplex driving.

Further examples of the problems with the conventional method for producing the liquid/polymer composite film include large limitation and difficulty in the production of the composite film.

In the production method (2), the liquid crystal dispersion is an aqueous thixotropic solution. For this reason, the coating property is generally so poor that it is not easy to form a homogeneous liquid crystal layer due to the inclusion of bubbles or the like. Further, it is difficult to increase the solid content of the liquid crystal dispersion, and in order to form a liquid crystal material layer having a thickness of several $\mu$m to ten-odd $\mu$m on a dry basis, it is necessary to form a layer having a thickness of ten-odd $\mu$m to several tens of $\mu$m, so that drying for a sufficiently long period of time is necessary.

Further, in the liquid crystal/polymer composite film produced by casting, since edge protrusions usually exist around the peripheral portion, the peripheral portion should be cut out in the production of a sandwich cell. For this reason, it is impossible to provide a liquid crystal/polymer composite film only in a necessary region on the substrate. Since the liquid crystal is expensive, this gives rise to a large problem of the production of a display cell and the production cost.

When a polymer dispersion-type liquid crystal display is used as a high-quality display panel, foreign matter, bubbles, unevenness of coating, etc. should not exist. However, the present situation is that the difficulty of defoaming, ccating/drying, etc. leads to large problems of productic rate, percentage non-defective, etc., so that a high-quality device cannot be produced at a low cost.

DISCLOSURE OF THE INVENTION

The present invention has been made in view of the above-described problems of the prior art, and an object of the present invention is to provide a polymer dispersion-type liquid crystal optical device having an evened thickness in the liquid crystal dispersion layer, a facilitated production process and an improvement in the yield, and a method for producing the same.

Another object of the present invention is to provide a polymer dispersion-type liquid crystal optical device excellent in the display characteristics such as high contrast, low driving voltage and sharpness, and a high productivity and a high quality, and a method for producing the same.

The liquid crystal optical device according to the present invention is characterized by comprising: a liquid crystal/polymer composite film comprised of a matrix polymer composed mainly of a transparent resin having an ionic dissociative group and, dispersed therein, a liquid crystal particle; and conductive substrates sandwiching the liquid crystal/polymer composite film therebetween, at least one of said conductive substrates being transparent.

The method for producing a liquid crystal optical device according to the present invention is characterized by comprising: dispersing a liquid crystal in a dispersion medium composed mainly of-water by a membrane emulsification process to prepare an oil-in-water type emulsion; preparing a composition for electrodeposition through the use of the resultant emulsion and a resin for a matrix polymer; electrodepositing the composition for electrodeposition on a conductive substrate to form an electrodeposited coating; and drying the electrodeposited coating to form, on a conductive substrate, a liquid crystal/polymer composite film comprising a matrix polymer and, dispersed therein, a liquid crystal particle.

BEST MODE FOR CARRYING OUT THE INVENTION

Figure 1A:
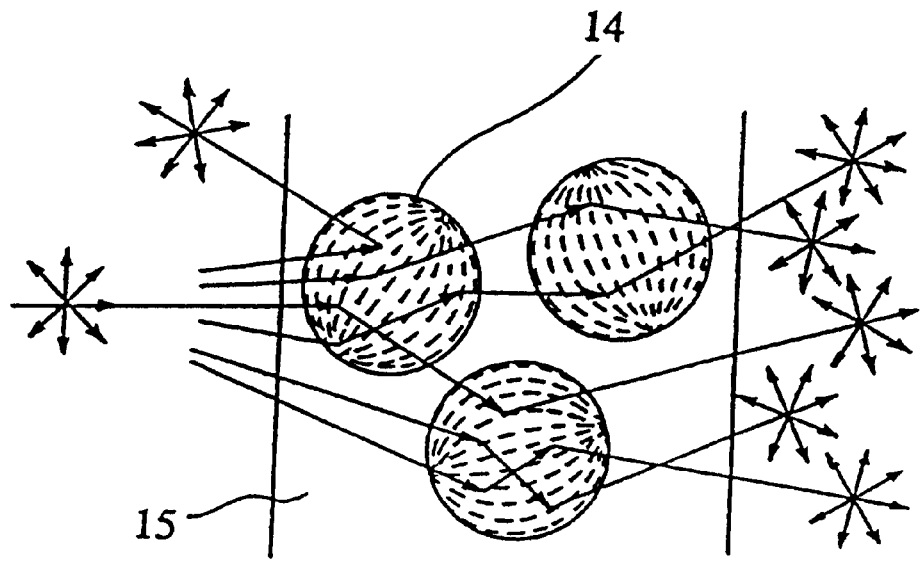
FIG. 1 is a diagram for diagramatically explaining the structure and operation of a liquid crystal optical device.
Figure 1B:
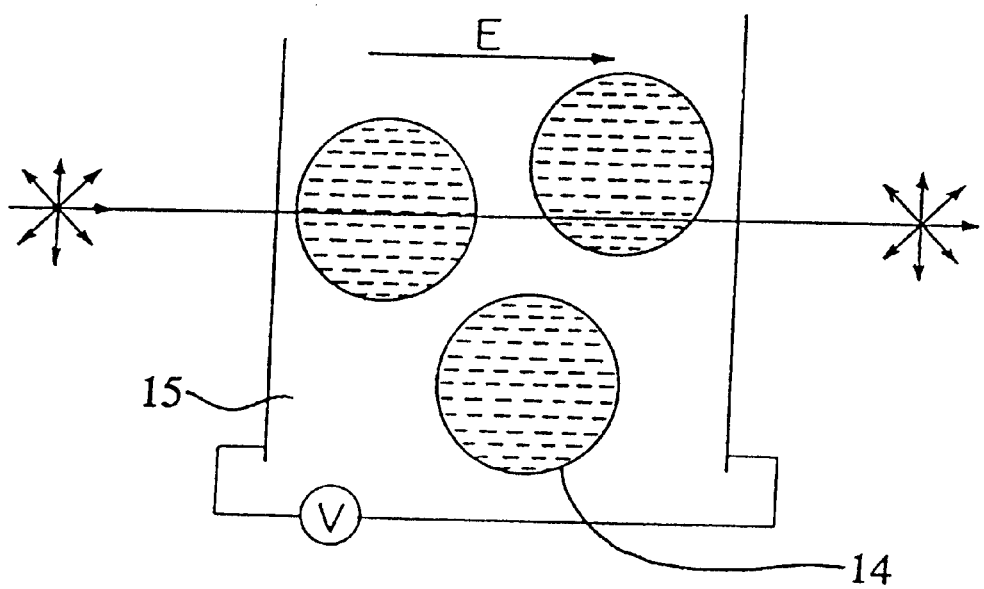

The present invention will now be described in more detail with reference to the following preferred embodiments.

The liquid crystal and matrix polymer material used in the liquid crystal optical device according to the present invention is formed by electrodeposition. The term "electrodeposition" used in the present invention should be interpreted in a broad sense and includes a coating forming method wherein use is made of electrical or electrochemical characteristics. Specifically, a coating forming material dissolved or dispersed in an aqueous solution is electrically or electrochemically deposited on the surface of a main electrode plate (an electrodeposition electrode) to form a coating.

A general conventional electrical coating method, which has been put to practical use, is an electrodeposition method for use in the coating of a metallic plate with a paint. In this method, a color pigment is dispersed in a polymer solution, a color coating is applied on a member through the use of the member as a main electrode plate. The electrodeposition method is classified into a cationic electrodeposition and an anionic electrodeposition according to an ionic reaction derived from the polarity of the main electrode, and the classification is conducted depending upon whether the electrodeposition substance behaves as a cation or an anion. In the above-described electrodeposition coating, in order to form a firm colored coating containing a pigment, a polymer material is cured by a heat treatment etc. after coating to increase the coating strength, and then put to practical use.

On the other hand, the composition for electrodeposition used in the method according to the present invention contains a liquid crystal material which is finely emulsified and dispersed in an aqueous binder solution and therefore different in main points from the conventional electrodeposition coating method wherein a pigment is dispersed.

The present inventors have found that a homogeneous, high-quality liquid crystal/polymer composite film can be formed by preparing a liquid crystal in a dispersion medium composed mainly of water to prepare an oil-in-water type emulsion and conducting electrodeposition through the use of a composition for electrodeposition produced from the resultant emulsion and a resin for a matrix polymer.

In the method according to the present invention, since a liquid crystal material (a liquid-crystal particle) finely dispersed in a solution constituting a binder can behave as a cation or an anion, it is possible to effectively conduct electrodeposition. Since the formed coating, as such, need not always have a high strength in a liquid crystal optical device according to the present invention, an intense curing treatment of a polymer material as a binder material is unnecessary after the application of a coating and a homogeneous, high-quality liquid crystal/polymer composite film can be formed by a treatment to such an extent that the solvent is removed. The present invention is excellent in this respect as well.

The liquid crystal material finely dispersed in a binder solution may be a liquid crystal droplet per se. Alternatively, the liquid crystal may be one micro-encapsulated in various capsule wall materials. Several methods may be adopted for electrodeposition-laminating a liquid crystal material on the surface of the electrode plate as a coating substrate from a binder solution containing the liquid crystal material finely dispersed therein. Preferred examples thereof include the following methods:

(1) a method wherein a liquid crystal droplet or a capsule member finely dispersed in a polymer for electrodeposition is coprecipitated accompanying the electrodepositing behavior of an electrodeposition-coatable polymer (in the same manner as electrodeposition coating);

(2) a method wherein an ionic property is imparted to a capsule wall material;

(3) a method wherein an ionic substance is adsorbed on the surface of a liquid crystal droplet or a capsule wall coating material to impart an apparent ionic property to the liquid crystal droplet or capsule wall film material;

(4) a method wherein a capsule is included in a polymer micell and oxidized on the counter electrode surface to release the capsule on the surface of the electrode. In this case, the micell becomes a capsule carrier; and (5) A method which comprises dispersing a capsule in an electrically insulating solvent, generating a contact charge on the surface of the capsule and electrophoresizing the capsule on the surface of the counter electrode.

The electrodeposition composition used in the present invention comprises a medium and, finely dispersed therein, a liquid crystal material (a liquid crystal particle). It is easy to finely disperse (emulsify) a liquid crystal droplet or an encapsulation product thereof. For example, according to a general method for producing an emulsion, a liquid crystal droplet or a capsulation product thereof is mixed in an aqueous solution in the presence of a suitable emulsifier, and an emulsion of a liquid crystal droplet or a capsulation product thereof is prepared by means of a strong mechanical agitation or an ultrasonic agitation or other means. Further, in some cases, a watersoluble polymer (for example, polyvinyl alcohol), which co-exists as a binder, may stably accelerate the emulsification.

Polyvinyl alcohol particularly preferably has a degree of saponification of 50 to 85% and a degree of polymerization of 300 to 1200.

When the degree of saponification is less than 50%, the solubility and dispersing capability (emulsifying capability) becomes insufficient. On the other hand, when the degree of saponification exceeds 85%, the balance between the hydrophilicity and the hydrophobicity breaks, which lowers the emulsifying capability, so that encapsulation becomes insufficient. This increases both the width of the particle diameter distribution and the average particle diameter, and a liquid crystal is included into a water phase, which has a great effect on electrooptical characteristics and deteriorates the workability.

When the degree of polymerization is less than 300, although the emulsifying capability increases, the strength of the composite film per se is spoiled. On the other hand, when the degree of polymerization exceeds 1200, although the film strength becomes large, the viscosity increases, so that the emulsification capability deteriorates and both the width of particle diameter distribution and average particle diameter become so large that a problem of electrooptical characteristics occurs and the workability deteriorates.

A hydrophobic liquid material, such as a liquid crystal material, is emulsified and dispersed in an aqueous solution under such a principle that a droplet is allowed to stably exist by coordinating a polar group of an emulsifier or a co-existing, water-soluble polymer around the droplet. Since this principle is well known in the art and widely utilized in the industry, the description on this principle will be omitted.

A general micro-encapsulation technique applied to other materials, as such, can be used for the micro-encapsulation of the liquid crystal. Examples of the general microencapsulation method include a chemical production method, a physicochemical production method and a physical/mechanical production method.

Examples of the chemical production method include an interfacial polymerization wherein use is made of a synthetic reaction, an in-situ polymerization method and a submerged curing coating method wherein a change in the properties of the polymer is created. The interfacial polymerization method comprises selecting a water-soluble monomer and an oil-soluble monomer as two monomers which bring about a polycondensation or a polyaddition reaction and dispersing one of them and conducting a reaction on its interface. The in situ polymerization method comprises supplying a reactant (a monomer or an initiator) from one of the inside and outside of the nucleating material and conducting a reaction on the surface of a capsule wall film. A submerged curing coating method (an orifice method) comprises previously encapsulating a nucleating material in a wall film material and curing the wall film in a curing solution.

Examples of the physicochemical production method include a coacervation method which utilizes a phase separation, an interfacial precipitation method (a submerged concentration method, a submerged drying method and a secondary emulsion method) and a melt dispersion method. The coacervation method may be used in an aqueous solution system as well as in an organic solvent system.

In the aqueous solution system, use may be made of a simple coacervation method wherein a phase separation is caused by reducing the solubility or a composite coacervation method wherein a phase separation is caused by an electrical interaction. In the organic solvent system, use is made of a phase separation phenomenon caused by a change in the solubility, temperature or the like.

The interfacial precipitation method enables the capsulation to be conducted under such a mild condition that a vigorous reaction, a rapid change in the pH value or the like is not involved. For example, in this method, an aqueous solution in which a nucleating material for a liquid crystal is dispersed is dispersed in a solution of a hydrophobic polymer in a solvent and further dispersed in a protective colloid solution. In the melt dispersion method, a waxy substance, such as a wax or polyethylene, is used as a wall film material, and a nucleating material is submerged into a liquid together with the waxy substance while heating.

Examples of the physical/mechanical production method include a spray drying method, an air suspension coating method and a vacuum deposition coating method. Since, however, the liquid crystal as the nucleating material is liquid at room temperature, the preparation of an emulsion for regulating the size of the nucleating material is a prerequisite, which renders this method unsuitable as a method for producing a capsule of a liquid crystal.

When use is made of the above-described various fundamental methods applied to a liquid crystal, such as an emulsion droplet method and a capsulation method, it becomes possible to prepare an emulsified liquid crystal solution or a capsule-dispersed solution used in the present invention which can be electrically migrated. It is necessary to properly select properties of a liquid crystal emulsion or a capsule dispersion depending upon how the emulsified liquid crystal solution or a capsule-dispersed solution is electrically migrated. An electrodeposited laminate coating layer is formed on the surface of a main electrode plate as a coating substrate through the utilization of properties described in the following items (1) to (5) based on the properties selected above. These methods will now be described in more detail.

(1) Method for Co-electrodepositing Liquid Crystal Material Through the Use of Polymer for Electrodeposition:

In this method, when a polymer is electrodeposited from a polymer solution for electrodeposition, a finely dispersed liquid crystal droplet or an encapsulated liquid crystal, which co-exists in the polymer solution for electrodeposition, is co-electrodeposited on the surface of the electrode plate. The electrodeposited polymer serves as a binder for the liquid crystal material to stabilize the coated film (see electrodeposition coating).

Various polymers such as naturally occurring resins, synthetic oils, alkyd resins, ester resins, acrylic resins and epoxy resins may be used as the organic polymer according to the present invention. Since the polymer for electrodeposition serves as a matrix polymer for a polymer dispersion-type liquid crystal optical device, it should be excellent in the optical characteristics, electrical characteristics and durability. In particular, it should be optically transparent as a matrix polymer, and acrylic and vinyl resins are preferred. The refractive index of the matrix polymer should be close to that of a polymer in which the liquid crystal is encapsulated, and both the refractive indexes of the matrix polymer and encapsulated polymer are in the range of from 1.3 to 1.7. Further, an acrylic resin is preferred from the viewpoint of the weather resistance. Such an acrylic resin should have an ionic dissociative function from the viewpoint of the electrodeposition and the dispersion of a liquid crystal or a capsule of a liquid crystal, and is produced by copolymerization with a monomer having an ionic dissociative group. Representative examples of the dissociative group include a carbonate group, a phosphate group and a sulfonate group. Examples of the monomer include (meth) acrylic acid, styrenesulfonic acid, 2-sulfoethyl (meth) acrylate, ω-carboxy-polycaprolactone mono(meth)acrylate, monohydroxyethyl phthalate (meth)acrylate monohydroxyethyl succinate (meth)acrylate and 2-hydroxyethylacryloyl phosphate. These may be copolymerized in a suitable proportion with any acrylic monomer or any vinyl monomer. Preferred examples of the comonomer include glycidyl (meth)acrylate, n-butyl (meth)acrylate, isobutyl (meth) acrylate, tert-butyl (meth)acrylate, methyl (meth)acrylate, ethyl (meth)acrylate, cyclohexyl (meth)acrylate, 2-ethylhexyl (meth)acrylate, lauryl (meth)acrylate, cetyl (meth)acrylate, pentadecyl (meth)acrylate, stearyl (meth) acrylate, behenyl (meth)acrylate, hydroxypropyl mono (meth)acrylate, polyethylene glycol mono(meth)acrylate, methoxyethylene glycol mono(meth)acrylate, polypropylene glycol mono(meth)acrylate, polyethylene glycol-polypropylene glycol mono(meth)acrylate, polyethylene glycol-polytetramethylene glycol mono(meth)acrylate, polypropylene glycol-polytetramethylene glycol mono (meth)acrylate, (iso)octyl (meth)acrylate, (iso)nonyl (meth) acrylate, (iso)propyl (meth)acrylate, phenylcarbitol (meth) acrylate, nonylphenylcarbitol (meth)acrylate, nonylphenoxypropyl (meth)acrylate, dicyclopentynyloxyethyl (meth)acrylate, polycaprolactone (meth)acrylate, 2-hydroxy-3-phenoxy (meth)acrylate, tert-butylcyclohexyl (meth)acrylate, styrene, α-methylstyrene, vinyl acetate and vinylpyrrolidone.

Maleinized oils and polybutadiene resin are known as the anionic resin for a long time, and the resins are cured by an oxidative polymerization. Therefore, these resins are characterized in that they cure upon being allowed to stand in the air.

The cationic resin is widely used in general electrodeposition coating, and mainly an epoxy resin which is utilized alone or after modification. In many cases, an isocyanate crosslinking agent is used for curing. Other examples of the resin include the so-called "polyamino resins" such as a polybutadiene resin, a melamine resin and an acrylic resin.

An oxidative polymerization method, a thermal polymerization method, a photocrosslinking curing method, etc. are used in the curing of the organic polymer film electrodeposited together with the liquid crystal material depending upon properties of a polymer used, and they serve to stably fix a liquid crystal material on the surface of a main electrode plate.

(2) Ionic Dissociative Encapsulation Method:

When use is made of a chemical production method, it is possible to impart an ionic dissociative property to the liquid crystal capsule per se through the use of a monomer or an initiator having an ionic dissociative property. Further, in the interfacial polymerization method, an ionic dissociative group can be introduced into the capsule wall film by using a material having an ionic dissociative group in an aqueous solution. In the in situ polymerization method as well, polymerization may be conducted in the presence of a polymerization initiator soluble in water as a dispersion medium, such as potassium persulfate, through the use of an ionic dissociative surfactant having a radical reactivity.

Further, with respect to the physicochemical production method as well, an ion dissociative capsule can be produced by previously introducing an ionic dissociative group into the wall film material in the above-described coacervation method or interfacial precipitation method.

In the cationic or anionic ion dissociative capsule dispersed in an aqueous solution, the ion is oxidized or reduced on the surface of the electrode having a polarity opposite to the capsule and electrodeposited on the surface of the electrode to form a coating of the liquid crystal capsule.

(3) Method for Adsorbing Ion Dissociative Substance on Liquid Crystal Droplet or Capsule Wall Film Surface:

An ion dissociative substance can be adsorbed on the surface of the previously prepared liquid crystal droplet or the surface of wall film of the capsule to permit the liquid crystal droplet or capsule to behave in the same manner as that of the adsorbed ion. Specifically, when use is made of a physical adsorption, an ionic surfactant or a polymer having an ionic dissociative group as an ionic dissociative substance, for example, (meth)acrylic acid, or a copolymer containing styrenesulfonic acid may be used as a protective colloid. Although the protective colloid basically has nothing to do with the structure of the copolymer described in the above item (1) in connection with the co-electrodeposition method, it can act as a protective colloid depending upon the composition of the copolymer and the amount of incorporation of a neutralizing agent.

Further, when a chemical adsorption is used, the object can be attained by using, as a capsule wall film material, a material having a functional group, such as a carboxyl group or an amino group, and introducing and adding an ionic dissociative substance having a reactivity with the material.

These methods are effective for a liquid crystal droplet into which an ionic group can be inherently introduced and when it is difficult to directly introduce an ionic group into the wall film material in the encapsulation.

(4) Method for Carrying Micell of Capsule:

In the present method, there is no need of adopting a special encapsulation method. Basically, a liquid crystal and an ionic surfactant or a protective colloid having an ionic dissociative property may be dispersed. In general, however, it is necessary to refine a capsule particle.

In the present method, when an organic pigment is dispersed in an aqueous solution of a certain surfactant and the surfactant is electrochemically oxidized on the electrode substrate, the dispersed pigment aggregates and settles to form a thin film of a pigment on the surface of the electrode. This method is called "micell electrolysis method" (see, for example, Japanese Patent Laid-Open Publication No. 26825/1973, Japanese Patent Laid-Open Publication No. 243298/1988, Tetsuo Saji, Hyomen, Vol. 30, No. 4 (1991), Chem. Lett., 693 (1988), Bull. Chem. Soc. Jan., Vol. 62, 2992 (1989), Electrochem. Soc., Vol. 136, 2953 (1989), J. Am. Chem. Soc., Vol. 103, 450 (1991), etc.).

The present method can be established by applying a micell electrolysis method to replace an organic pigment with a liquid crystal capsule.

The addition of a nonionic surfactant (commercially available) containing ferrocene to an aqueous solution containing a micro capsule enables the capsule to be sufficiently dispersed. This is so because the capsule is introduced into the resultant micell structure (or the surfactant is adsorbed on the surface of the capsule wall film surface), so that a complete dispersion into an aqueous solution can be attained. When a main electrode plate is placed in the aqueous solution and electrolysis is conducted at an oxidation potential, micell is oxidized, so that the surfactant adsorbed on the surface of the capsule is desorbed. At that time, the capsule becomes impossible to maintain the dispersed state and aggregates and settles on the surface of the main electrode. The oxidized surfactant is attracted to the opposite electrode and reduced and becomes again an active state which enables a micell to be prepared. Therefore, the behavior of the surfactant is cyclically conducted, and the state become as if the micell carries the capsule.

According to this method, although a dense, good-quality capsule film can be prepared, a long period of time is unfavorably required for forming a capsule film having a desired thickness (for example, 10 $\mu$m). Further, a liquid crystal droplet cannot be used because a film cannot be formed due to the absence of a binder after the electrodeposition.

(5) Electrophoresis of Charged Capsule:

The particle dispersed in an electrically insulating solvent generally generates a given contact potential in a correlationship between the solvent and the particle. This principle is a well known phenomenon used in a liquid development method in electrophotography or electrostatic printing. The utilization of this principle enable a coating to be prepared by electrophoresis of the liquid crystal capsule.

The charged capsule can be prepared by microencapsulating a liquid crystal material according to a general method and subjecting the microcapsule to a solvent replacement with an electrically insulating solvent or introducing an ionic dissociative substance into a capsule nucleating material or imparting an ionic dissociative property. In the latter case, when an ionic dissociative substance is also present in a liquid crystal solution as the nucleating material, since the wall film is semipermeable, it becomes possible for the counter ion to come out into the outside of the capsule. This causes an electrical double layer to be formed around the capsule, so that a charge is generated on the surface of the capsule. However, the co-existence of the liquid crystal and the ionic substance is not preferable (since the mechanism of generation of an electrostatic charge is unclear in many points, no satisfactory theory can be established.)

In any event, since the capsule in an electrically insulating solvent is present as a charged particle, the capsule can migrate to the surface of an electrode having a charge opposite to the charged particle to electrostatically form a film.

As is apparent from the foregoing description, a polymer dispersion-type liquid crystal film coating having a high performance required of a liquid crystal. panel can be stably produced by preparing a liquid crystal droplet or a liquid crystal microcapsule having an electrical migration capability suitable for electrodeposition and electrically adsorbing or electrochemically reaction-depositing the liquid crystal material on a suitable electrode member as a coating substrate.

In the production of a panel used in an actual liquid crystal display, since the display region of the panel comprises ITO or other conductive material, direct utilization of the panel as a main electrode in the electrodeposition of the liquid crystal material enables a polymer dispersion-type liquid crystal material having a necessary thickness to be coated on the surface of the panel. In this case, the liquid crystal is in a droplet, capsule, indefinite continuous or other form.

When ITO is used in the main electrode of the electrodeposition, it is preferred to use an anionic material because, in a cationic material, a neutralizing agent causes the crystal on the surface thereof to deteriorate during electrodeposition to form an opaque substrate having a dark brown color and a high resistance value. When use is made of a cationic material, it is necessary to provide a transparent, very thin protective layer on the surface of the ITO film.

Further, it is also possible to use a method which comprises preparing a suitable coating of a liquid crystal material on a conductive substrate (which may be patterned according to need) for exclusive use in electrodeposition not used for a panel, and transferring a liquid-crystal-containing layer at a predetermined position of other member surface. According to this method, use may be made of a cationic material, which expands the range of selection of the resin for electrodeposition. Further, this method has many advantages including that a good coating alone can be selectively formed into a panel, there is no need of preparing an electric wiring for electrodeposition for each panel surface, the electrodeposition substrate can be repeatedly used, and a convenient and rational process can be constructed.

A further preferred embodiment of the present invention will now be described with reference to the case where use is made of a membrane emulsification process.

In recent years, the membrane emulsification process in this embodiment, wherein an emulsion is produced through the use of a porous film, is expected to be used in the production in pharmaceuticals, cosmetics, foods, etc. (see Tadano Nakajima and Masataka Shimidzu, PHARM TECH JAPAN, Vol. 4, No. 10 (1988)). The present inventors have found that the adoption of the above-described membrane emulsification method is favorable in the preparation of a liquid crystal/polymer composite film which is the heart of a liquid crystal display device and can provide an emulsion in which a liquid crystal having a homogeneous particle diameter is dispersed. Further, it was found that a liquid crystal/polymer composite film having excellent characteristics, such as a high contrast, a low driving voltage and a sharpness, can be prepared.

In the above-described membrane emulsification method, since the size of the liquid crystal emulsion particle depends upon a pore diameter of the porous membrane, an emulsion having an even particle diameter can be prepared through the use of a porous membrane having a narrow pore diameter distribution. The average particle diameter of a dispersed particle of the liquid crystal is preferably 1 to 5 $\mu$m.

The porous membrane used in the method of the present invention should have a homogeneous pore diameter and maintain a suitable mechanical strength. Examples of the porous membrane capable of satisfying the above-described requirements include a porous glass produced through the utilization of a phase separation phenomenon of $Na_2O$—$B_2O_3$—$SiO_2$ glass (see U.S. Pat. No. 2,215,039).

Figure 2:
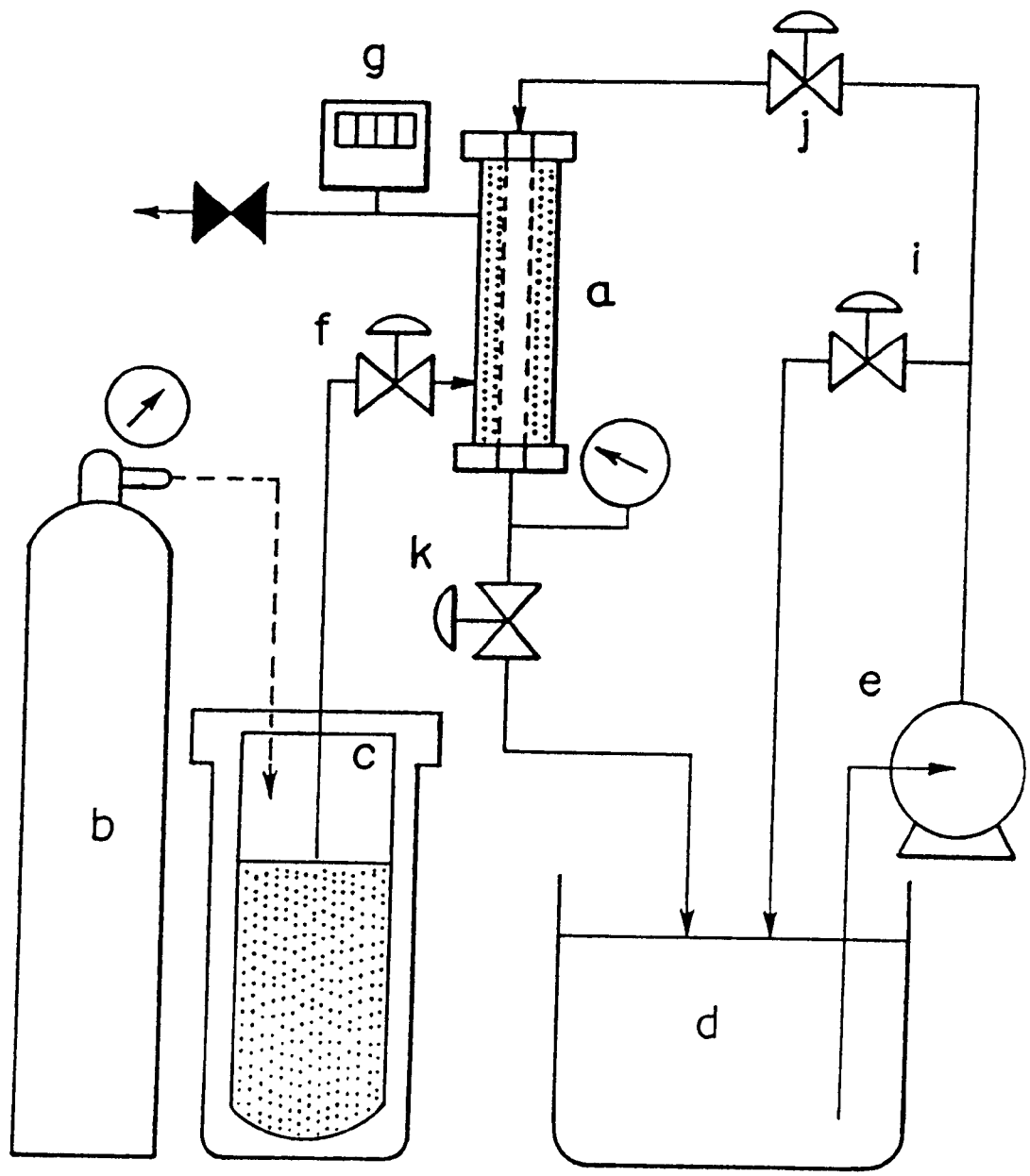
FIG. 2 is a conceptual diagram of an apparatus for practicing a membrane emulsification process.

A conceptual diagram of an apparatus for producing a liquid crystal emulsion through the use of a porous glass molded into a pipe is shown as one preferred embodiment in FIG. 2.

A dispersion medium composed mainly of water preferably containing a protective colloid, such as polyvinyl alcohol, or a surfactant, is placed in an emulsion tank (d), and circulated by means of a pump (e) along a line comprising a valve (i), an inline pressure gage (j) for a porous membrane and leading to a needle valve (k). The circulation pump (e) is preferably selected from such types of pumps that the shear force is low and the pulsating flow is small so that the formed emulsion particle is not broken.

On the other hand, the liquid crystal tank (c) is pressurized by the pressure of nitrogen introduced from a nitrogen bomb (b), and the liquid crystal subjected to a regulation of pressure by means of a valve (f) is forced into a tubular material (a) wherein an opening of the porous material is opened into the inner surface thereof, and dispersed in a micro droplet form in a dispersion medium. The pore diameter of the porous material used in this case is usually preferably 0.1 to 1 $\mu$m, still preferably 0.2 to 0.5 $\mu$m. Although the liquid crystal forcing pressure varies depending upon the size of the apparatus, the kind of a liquid crystal, the fine pore diameter of the porous material, the composition of the dispersion medium, etc., it is usually 1 to 10 $kgf/cm^2$, preferably 1.5 to 4 $kgf/cm^2$.

A water-soluble or a water-dispersive matrix resin is previously added to the dispersion medium composed mainly of water placed in the tank (d). The matrix resin used herein is preferably the above-described polymer having an ionic dissociative group, preferably an acrylic or vinyl polymer. When the emulsification is hindered by viscosity etc., it is possible to use a method which comprises adding a stabilizer (a surfactant) different from the matrix resin during the production of an emulsion, that is, to a dispersion medium coposed mainly of water to produce an emulsion and then dissolving or dispersing a matrix resin to the emulsion. The stabilizer is a generally commercially available nonionic surfactant, and use may be made of a polymer having a polar group such as a hydroxyl group or an ether bond. Examples of such a polymer include polyvinyl alcohol, cellulose, hydroxyethyl(propyl) cellulose, polyhydroxyethyl methacrylate, polyhydroxypropyl methacrylate, polyglycerol methacrylate, polyethylene glycol methacrylate and further copolymers of these monomers having a hydroxyl group with other monomer.

It is also possible to use a method wherein, after the production of an emulsion, water is removed for concentration so that the emulsion is rendered suitable for use in electrodeposition coating. Further, in order to attain the solubility and electrodeposition capability of the matrix resin, it is preferred to add a hydrophilic organic solvent such as ethanol, isopropanol, methyl cellosolve, ethyl cellosolve, glycol or carbitol. If necessary, it is also possible to use a hydrophobic solvent such as xylol and triol.

In the method of the present invention for forming a liquid crystal/polymer composite film from the liquid crystal particle dispersion thus obtained, the above-described composite film is directly formed on the conductive substrate which is one of the electrode substrates of the liquid crystal display device. The term "electrodeposition coating" used herein is intended to mean a method which comprises placing a main electrode as a coating substrate and a counter electrode in a coating solution, a current is flowed across the electrodes to electrically adsorb or deposit the liquid crystal particle and polymer matrix on the substrate, taking the coated substrate out of the coating solution and removing the dispersion medium to provide a coating.

In the production of a panel used in an actual liquid crystal display, since the display region of the panel comprises ITO or other conductive material, direct utilization of the panel as a main electrode for electrodeposition enables a liquid crystal/polymer composite film having a necessary thickness to be formed on the surface of the panel. Although the state of the liquid crystal in this case is basically a droplet, part thereof may be in a coalescent state. When use is made of a curable matrix resin, it is also possible to adopt curing means such as heat, an ultraviolet radiation or an electron beam. The amount of the liquid crystal in the liquid crystal/polymer composite film thus formed is preferably in the range of from 60 to 90% by weight based on the weight of the whole film. The thickness of the composite film and the surface roughness are preferably about 3 to 15 $\mu$m and 1 $\mu$m or less, respectively.

It is also possible to use a method which comprises providing a conductive substrate for extensive use in electrodeposition (which may be patterned according to need), forming a suitable coating comprising a liquid crystal particle and a polymer matrix and then transferring the coating onto a predetermined position of other panel member surface. This method has many advantages including that a good coating alone can be selectively formed into a panel, there is no need of preparing an electric wiring for electrodeposition for each panel surface, the electrodeposition substrate can be repeatedly used, and a convenient and rational process can be constructed.

The term "liquid crystal" used in the present invention is intended to mean an organic mixture which exhibits a liquid crystal state around room temperature and includes a nematic liquid crystal, a cholesteric liquid crystal and a smectic liquid crystal. Among them, a nematic liquid crystal or a nematic liquid crystal containing a cholesteric liquid crystal added thereto is preferred from the viewpoint of properties when the liquid crystal is used as a display. On the other hand, when a memory function is necessary, the smectic liquid crystal is preferred.

A pigment may also be incorporated in the liquid crystal for the purpose of improving the contrast or tone. When a dichroic dye is added, it is also possible to use the liquid crystal device not only as a scattering-transmission display device but also as a display medium wherein switching is conducted in a light absorption (colored)-transparent state through the utilization of the guest-host effect of the dye.

In a further preferred embodiment of the present invention, the liquid crystal display device comprising a liquid crystal/polymer composite film according to the present invention can be prepared by treating the liquid crystal emulsion produced by the above-described membrane emulsification method to provide a microcapsule including a liquid crystal and preparing a liquid crystal display device comprising a liquid crystal/polymer composite film according to the above-described method through the use of the microcapsule dispersion per se or after separation of the microcapsule followed by preparation of an electrodeposition solution. Both the chemical production method and physicochemical production method may be utilized as a method for producing a microcapsule from a liquid-crystal-dispersed emulsion produced by the membrane emulsification process.

Examples of the chemical production method include an interfacial polymerization wherein use is made of a synthetic reaction, an in-situ polymerization method and a submerged curing coating method wherein a change in the properties of the polymer is created. The interfacial polymerization method comprises selecting a water-soluble monomer and an oil-soluble monomer as two monomers which bring about a polycondensation or a polyaddition reaction and dispersing one of them and conducting a reaction on its interface. The in situ polymerization method comprises supplying a reactant (a monomer or an initiator) from one of the inside and outside of the nucleating material and conducting a reaction on the surface of a capsule wall film.

Examples of the physicochemical production method include a coacervation method which utilizes a phase separation, an interfacial precipitation method (a submerged concentration method, a submerged drying method and a secondary emulsion method) and a melt dispersion method. The coacervation method may be used in an aqueous solution system as well as in an organic solvent system.

The interfacial precipitation method enables the encapsulation to be conducted under such a mild condition that a vigorous reaction, a rapid change in the pH value or the like is not involved. For example, in this method, an aqueous solution in which a nucleating material for a liquid crystal is dispersed is dispersed in a solution of a hydrophobic polymer in a solvent and further dispersed in a protective colloid solution.

The matrix resin for the encapsulated liquid crystal particle preferably contains a resin which has an ionic functional group and can become insoluble in water and precipitate by an electronic exchange, and preferred examples thereof include an acrylic acid copolymer, a vinyl copolymer, a water-soluble alkyd resin, a modified maleinized oil and a modified phenolic resin. In particular, as described above, an acrylic acid copolymer and a vinyl copolymer having an ionic dissociative property are preferred from the viewpoint of optical characteristics, electrical characteristic and durability.

According to the finding of the present inventors, as opposed to the conventional casting method, the use of the above-described electrodeposition method is less liable to the occurrence of a problem of the projection around the coating. Even when use is made of an electrodeposition method, the periphery of the formed liquid crystal/polymer composite film often protrudes. In particular, when the coating is conducted over the whole surface, if the protruded portion is not removed, it becomes difficult to laminate a counter electrode on the composite film. Further, in the patterned coating as well, since the lamination of the composite film on the counter electrode for each patterning is necessary, it is necessary to prevent the occurrence of the above-described protrusion as much as possible. According to the finding of the present inventors, in order to eliminate the above-described problem, it is very useful for the counter electrode in electrodeposition coating to have a shape similar or congruent to an electrode (a conductive substrate) to be electrodeposition-coated. In the formation of a liquid crystal/polymer composite film by electrodeposition coating, the provision of a counter electrode having a shape similar or congruent to an electrode (a conductive substrate) to be electrodeposition-coated can render the current density of the electrode to be electrodeposition-coated homogeneous, so that it becomes possible to form a homogeneous liquid crystal/polymer composite film free from protrusion around the film.

For example, when an ITO glass plate is used as an electrode in the electrodeposition coating onto only a predetermined portion in a predetermined position, although ITO may be patterned, the portion to be electrodeposition-coated may be patterned by means of a resist. In this case, the coating, as such, may be laminated on the counter electrode to conduct sealing, which contributes to an improvement in the reliability and durability. Further, when a black color is given to the resist, the visibility can be improved and further an unnecessary portion can be shielded.

Further, in the above-described polymer dispersion-type liquid crystal display device, the addition of a dye to the liquid crystal and matrix polymer can provide a multicolor display which needs no color filter.

A preferred embodiment will now be described.

Figure 5:
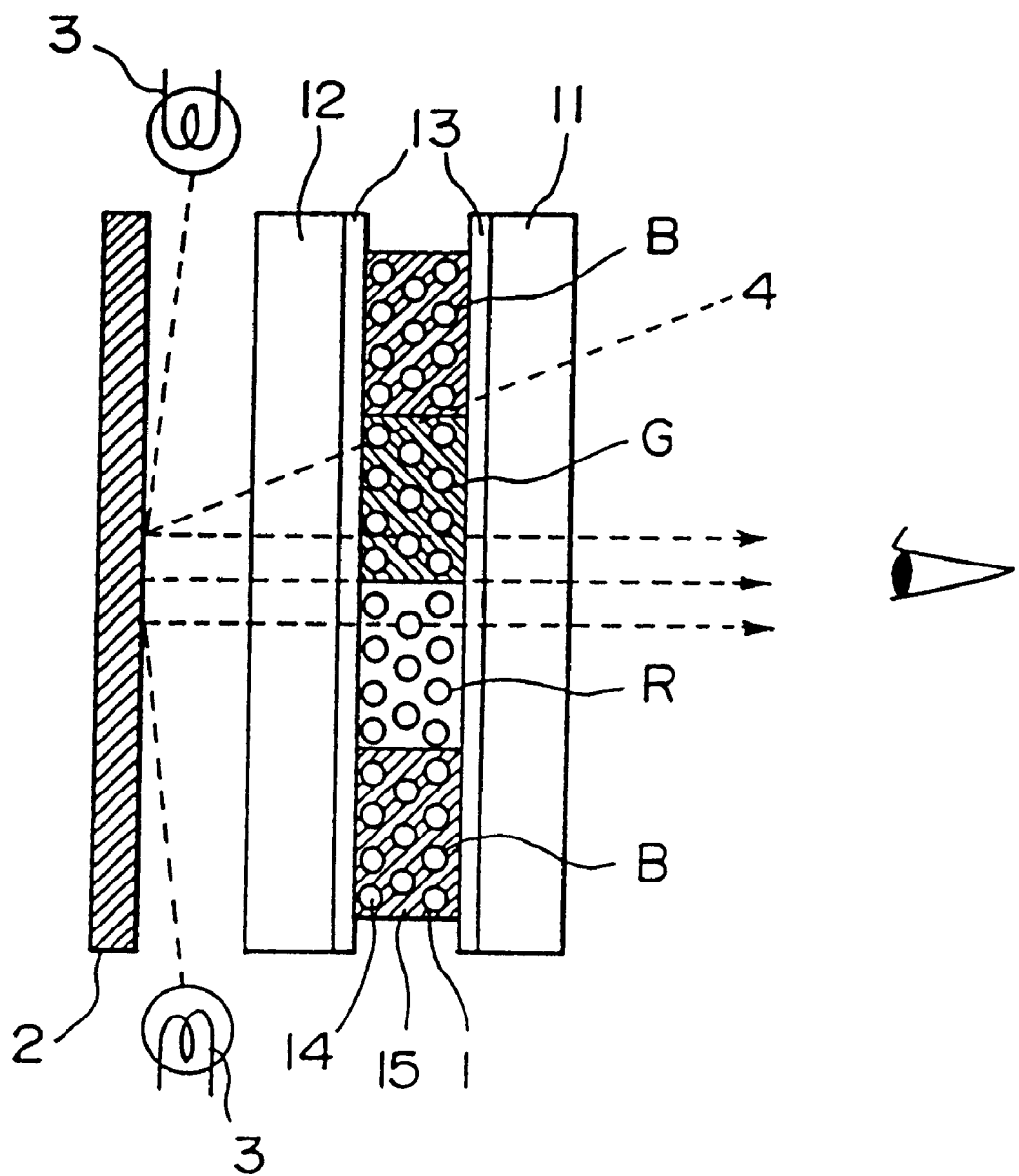
FIG. 5 is a diagram for explaining the construction of a multi-color liquid crystal display apparatus.

One embodiment of the construction of the multi-color display according to the present invention is shown in FIG. 5.

In the liquid crystal display of the present invention, a display layer 1 is sandwiched between two sheets of substrates, such as a glass or a film provided with a transparent conductive film 13 serving as an electrode. The above-described display layer 1 comprises: each picture element region (RGB) comprised of a polymer matrix layer 15 containing pigments for three primary colors of R (red), G (green) and B (blue); and, dispersed therein, a particulate, preferably encapsulated liquid crystal 14. It is preferred that a dichroic dye capable of absorbing light, which cannot be absorbed by the dye contained in the matrix, be added to the liquid crystal particle dispersed in a capsule form.

Since the dichroic dye in the liquid crystal changes the molecular direction accompanying the alignment of the liquid crystal molecule by electrolysis, optical absorption characteristics are changed by the application/nonapplication of voltage. When the absorption of the dichroic dye is sufficiently low, the picture element exhibits a color derived from the dye contained in the matrix. On the other hand, when the absorption of the dichroic dye is sufficiently high, the picture element exhibits, for example, a black color due to mixing of the dichroic dye with the dye in the matrix.

In the above-described display device, the combination of the liquid crystal with the dichroic dye provides two modes. Conceptual diagrams of picture elements of hue of green (G) are shown in FIGS. 6A and 6B.

Figure 6A:
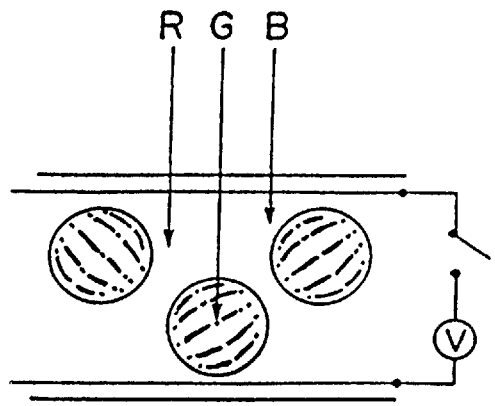
FIG. 6 is a diagram for explaining an operation mode of a multi-color display.
Figure 6A:
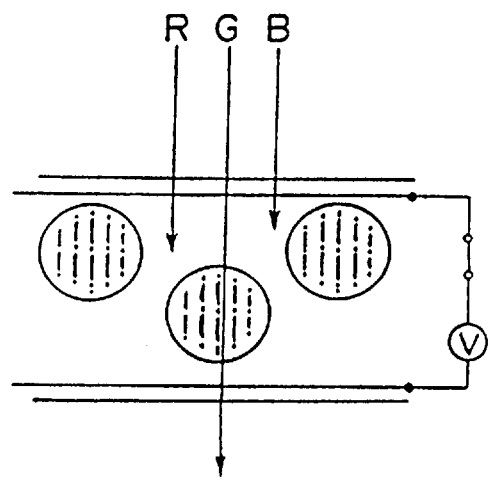

In a normal mode shown in FIG. 6A, the combination of a liquid crystal having a positive dielectric anisotropy with a p-type dye provides a hue of the matrix layer when a voltage is applied (see FIG. 6A (a)) and a black color when no voltage is applied (see FIG. 6A (b)).

Figure 6B:
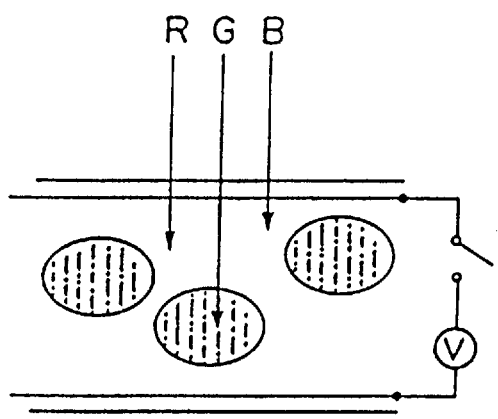
Figure 6B:
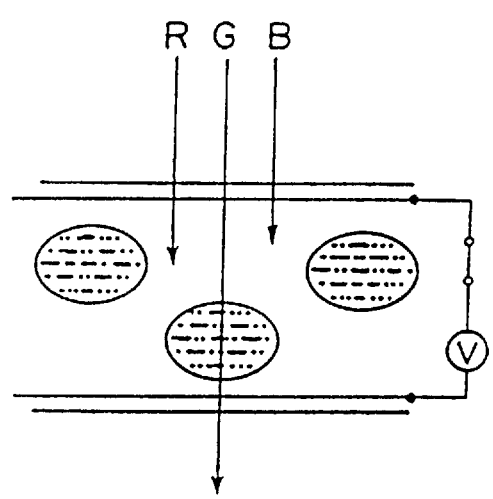

On the other hand, in a reverse mode shown in FIG. 6B, the combination of a liquid crystal having a negative dielectric anisotropy with an n-type dye provides a black color when a voltage is applied (see FIG. 6B (a)) and a hue of the matrix layer when no voltage is applied (see FIG. 6B (b)).

The dye contained in the matrix may be a dye or a pigment. Although part of the dye may be contained in the liquid crystal phase, since this is causative of an increase in the driving voltage, it is preferred for the dye to be present in the matrix as much as possible.

Dyeing of the matrix layer with the dichroic dye contained in the liquid crystal should avoid as much as possible because it lowers the contrast of a displayed image. For this reason, it is preferred for the liquid crystal particle to be encapsulated. Dichroic dyes respectively for R, G and B picture elements contained in the liquid crystal may be different from each other for the purpose of improving the chromaticity and the optical utilization efficiency.

The above-described picture element regions respectively for R, G and B are placed in regular patterns such as a stripe pattern and a mosaic pattern. These regions have corresponding electrodes, and on/off for each picture element is possible by application of a voltage.

A diffusion reflection plate 2 is provided behind the polymer dispersion-type liquid crystal layer cell, and a white light source 3 is usually provided behind the cell for obtaining a sufficient brightness.

The method for producing a multicolor display according to the present invention will now be described.

According to the present invention, in the above-described electrodeposition coating, it is preferred that a dichroic dye be added to the liquid crystal used and the liquid crystal be added to an aqueous solution of a resin. Alternatively, it is also possible to use a method wherein a microcapsule including a liquid crystal containing a dichroic dye is produced and the resultant microcapsule is dispersed in an aqueous solution of a resin. Further, a dye for dyeing the matrix is dispersed or dissolved in the above-described dispersion to prepare a coating solution.

The resin used in the electrodeposition coating preferably contains a resin which has an ionic functional group and can become insoluble in water and precipitate by an electronic exchange, and as described above, an acrylic acid copolymer and a vinyl copolymer are still preferred.

In order to attain an improvement in the solubility of the matrix resin and to form a smooth coating, it is preferred to add an organic solvent in an electrodeposition coating solution. Preferred examples of the organic solvent used herein include alcohols such as methanol, ethanol and isopropanol and hydrophilic organic solvents such as cellosolves such as methyl cellosolve, ethyl cellosolve, glycol and carbitol. If necessary, use may be made of hydrophobic solvents such as xylol and toluol.

In the present invention, surfactants for imparting a dispersion stability, leveling agents for improving the smoothness of the coating, antifoaming agents, etc. may be used as an assistant.

A polymer dispersion-type liquid crystal layer of RGB is preferably electrodeposition-coated on the substrate by the following method. However, the method is not limited to the following one.

(1) A method which comprises providing, on an electrodeposition insulating substrate, an electrode comprising a conductive film divided into a plurality of regions, selecting each electrode and applying a voltage, forming a polymer dispersion-type liquid crystal layer by means of electrodeposition coating on the electrode to which the voltage is applied and repeating the above procedure to form a multicolor polymer dispersion-type liquid crystal layer on each electrode. In this case, when the electrode to be electrodeposition-coated is previously patterned by means of a resist, sealing as well can be simultaneously conducted, and when a black color is given to the resist, the resist can serve also as a black matrix.

(2) A method which comprises forming a predetermined resist pattern on a conductive substrate, forming a polymer dispersion-type liquid crystal layer on an opening of the resist by electrodeposition coating, removing part of the resist in a predetermined pattern to expose the electrode and forming a polymer dispersion-type liquid crystal layer having a different hue on the exposed electrode. In this case as well, when a black color is given to the resist, the resist can serve as a black matrix.

(3) A method wherein use is made of a substrate different from the display electrode and the polymer dispersion-type liquid crystal layer patterned by the above-described method (1) or (2) is transferred onto the display substrate.

Further, a layer for enhancing surface smoothness can also be formed on the polymer dispersion type liquid crystal layer. It is also possible to level the polymer dispersion-type liquid crystal layer by means of grinding, pressing, etc. Further, in order to prevent a lowering in the contrast due to the occurrence of light leakage, it is possible to apply the so-called "black matrix formation method" to between regions of three primary colors in the polymer dispersion-type liquid crystal layer.

The present invention will now be described in more detail with reference to the following Examples and Comparative Examples. "Part(s)" or "%" in the description is by weight unless otherwise specified.

EXAMPLE 1

A liquid crystal emulsion A having a weight ratio of a continuous phase to a dispersed phase of 200:40 was produced through the use of a membrane emulsification. system manufactured by Ise Chemicals Corporation.

Dispersed phase: nematic liquid crystal (E-44 manufactured by BDH)

Continuous phase: 1% aqueous solution of polyoxyethylenesorbitan monolaurate (Tween 20 manufactured by Kao Corp.)

Figure 3A:
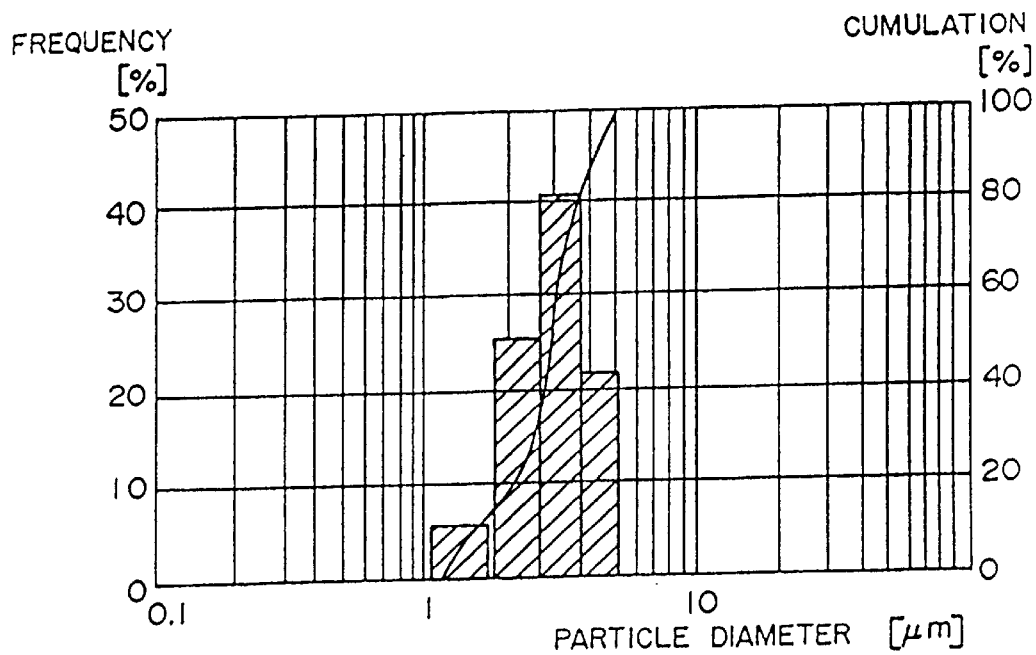
FIG. 3 is a diagram for explaining a particle size distribution of an emulsion in an example of the present invention.

Porous glass: MPG manufactured by Ise Chemicals Corporation; pore diameter=0.27 μm Inline pressure: 2.35 to 2.45 kgf/cm$^2$ The particle size distribution of this solution was measured and found to be narrow as shown in FIG. 3A. A coating solution for electrodeposition having the following composition was prepared.

| Composition: | |
|---|---|
| Emulsion A | 240 parts |
| Methacryl acid/butyl methacrylate copolymer | 5 parts |
| Triethylamine | 1.4 parts |
| Methyl cellosolve | 7 parts |
| Water | 20 parts |
| Ethanol | 15 parts |

The above-described coating solution was placed in an electrodeposition bath, a glass plate provided with ITO and a platinum plate were used respectively as an anode and a cathode, and the system was energized at room temperature and a voltage of 30 V for 20 sec to electrodeposit a liquid crystal particle and a polymer matrix on the anode. The glass substrate provided with ITO was pulled up and washed with water and then dried at about 60° C. for one hour to form a liquid crystal/polymer composite film having a thickness of 11 μm. The film was sandwiched between other glasses provided with ITO to provide a liquid crystal cell which is the liquid crystal optical device of the present invention.

Figure 4:
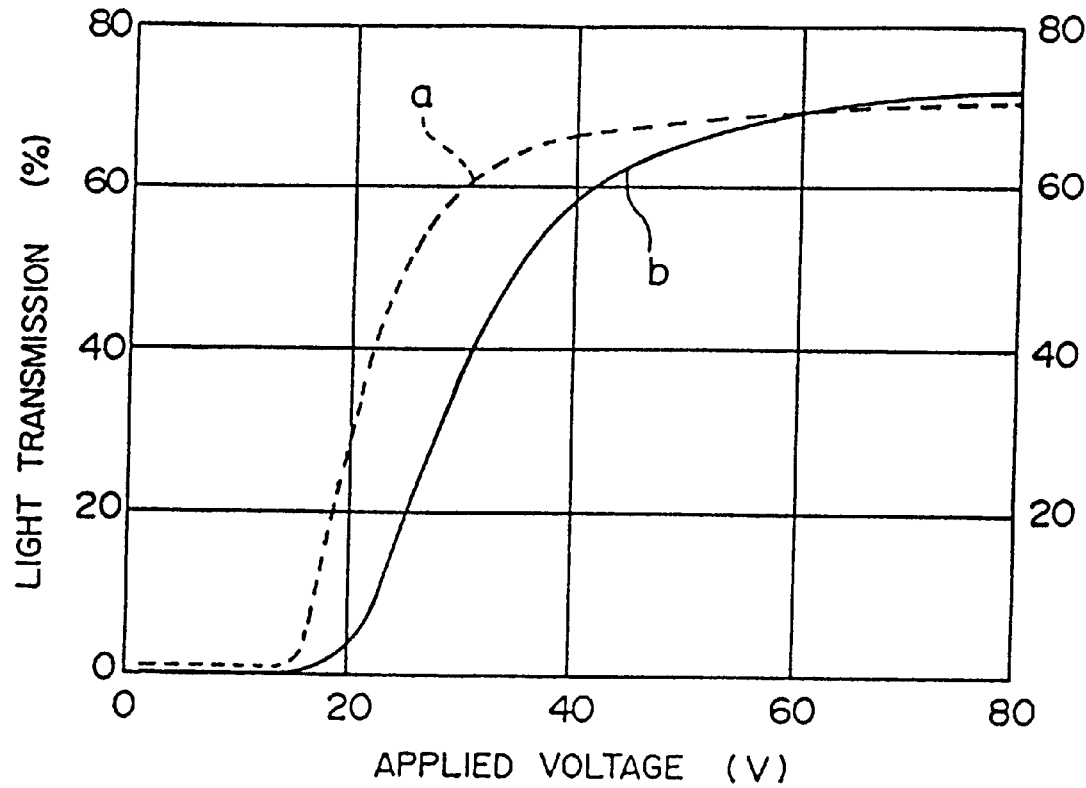
FIG. 4 is a diagram for explaining a change in the light transmission.

The light transmission of the cell was measured by using PROTAL 5,000 manufactured by Otsuka Denshi K.K. and a halogen lamp as a light source. A wedge-shaped wave of 1 kHz was used as the applied voltage. As shown in FIG. 4(a), a change in the light transmission showed that the cell was excellent in the contrast, driving voltage and sharpness.

The methacrylic acid/butyl methacrylate copolymer used herein was synthesized by the following method.

Synthesis Method:

28 Parts of methacrylic acid and 82 parts of butyl methacrylate were dissolved in 170 parts of methyl cellosolve. 2 Parts of azoisobutyronitrile was added thereto, and the system was stirred at 60° C. for 6 hr to conduct a reaction. After the completion of the reaction, the reaction mixture was poured into a large amount of a mixed solution comprising water and methanol to provide a polymer. Further, a reprecipitation procedure was conducted in a methanol/water system, and the resultant precipitate was dried in vacuum for purification.

Reference Example 1

200 Parts of a 1% aqueous solution of polyoxyethylenesorbitan monolaurate (Tween 20 manufactured by Kao Corp.) and 40 parts of E-44 were stirred by means of a homomixer at a number of revolutions of 5,000 rpm for 5 min to produce an emulsion.

Figure 3B:
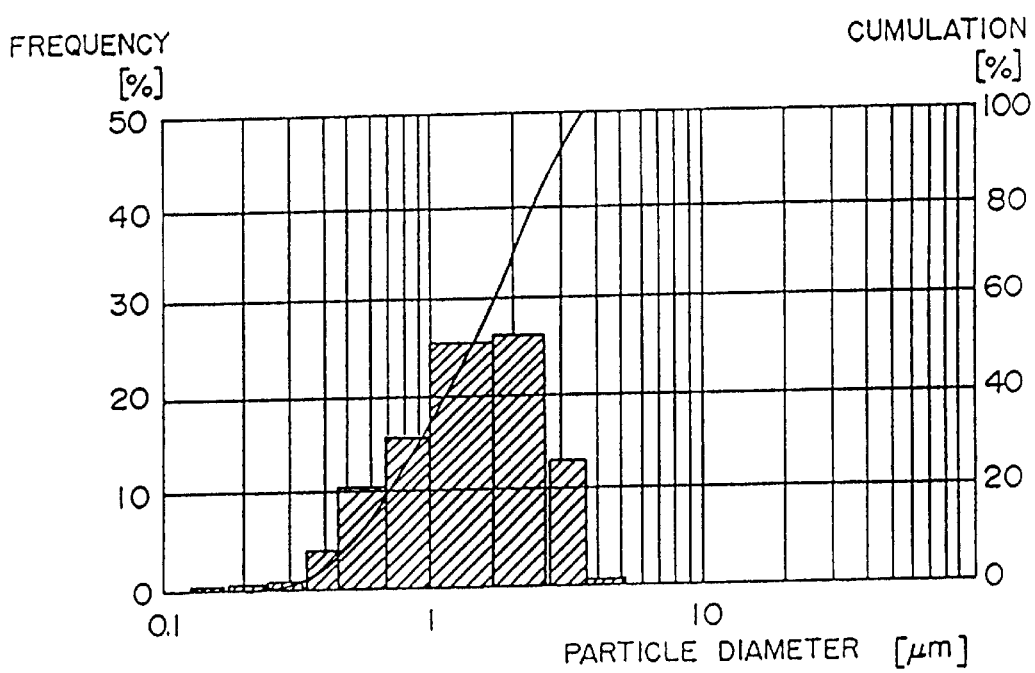

The particle size distribution of the emulsion was broad as shown in FIG. 3B. A cell was prepared from the emulsion in the same manner as that of Example 1. As shown in FIG. 4(b), a change in the light transmission of the cell showed that the cell exhibited a high driving voltage and a poor sharpness.

EXAMPLE 2

A liquid crystal emulsion A having a weight ratio of a continuous phase to a dispersed phase of 200:40 was produced through the use of a membrane emulsification system.

| | |
|---|---|
| Dispersed phase (E-44) | 37.3 parts |
| Polyisocyanate (Coronate HX manufactured by Nippon Polyurethane Industry Co. Ltd.) | 2.7 parts |

Continuous phase: 1% aqueous solution of polyoxyethylenesorbitan monolaurate (Tween 20 manufactured by Kao Corp.)

Porous glass: MPG manufactured by Ise Chemicals Corporation; pore diameter=0.27 μm Inline pressure: 2.75 to 2.85 kgf/cm$^2$ Parts of a 5% aqueous solution of diethylenetriamine was dropwise added by portions to the resultant emulsion, and the mixture was stirred at 60° C. for 5 hr to provide a capsule containing a liquid crystal. Water in the dispersion of a capsule was removed under reduced pressure until the content of the non-volatile component became 40%. Thereafter, the procedure of Example 1 was repeated to prepare a liquid crystal/polyer composite film having a thickness of 10 μm. The film was sandwhiched between other PET films provided with ITO to provide a liquid crystal cell which is the liquid crystal optical device of the present invention.

As shown in FIG. 4(a), a change in the light transmission showed that the cell exhibited satisfactory contrast, driving voltage and sharpness.

Reference Example 2

A comparative liquid crystal cell was prepared in the same manner as that of Example 2, except that in the production of the emulsion, stirring was conducted by means of a homomixer at 5,000 rpm for 5 min. As with the change in the light transmission shown in FIG. 4(b), a change in the light transmission of the cell thus produced showed that the cell had a high driving voltage and a poor sharpness.

As described above, according to the present invention, the use of a membrane emulsification method in the fine emulsification of a liquid crystal can provide a liquid crystal emulsion wherein a liquid crystal is dispersed in a homogeneous particle diameter. When the resultant emulsion is rendered electrodepositable and then utilized, it becomes possible to provide a liquid crystal display device containing a liquid crystal/polymer composite film excellent in display characteristics such as a high contrast, a low driving voltage and a sharpness.

EXAMPLE 3

10 Parts of a liquid crystal material for PDLC (trade name No. SL009 manufactured by Merck, Limited) was added to an aqueous acrylic resin solution comprising 55 parts of an anionic acrylic resin, 15 parts of ethyl cellosolve, 3 parts of isopropyl alcohol, about 1 part of triethylamine (a neutralizing agent) and 1,000 parts of pure water, and the mixture was strongly agitated to prepare an emulsion of a liquid crystal.

The emulsion was placed in an electrodeposition bath, and electrodeposition was conducted at room temperature and a voltage of 20 to 60 V for a suitable period of time. In this case, a platinum plate was used as a negative electrode, and a glass plate for a panel and provided with an ITO transparent conductive film as a main electrode for electrodeposition was used as a positive electrode. Thus, a polymer dispersion-type liquid crystal film having a thickness of 10 μm was prepared. Then, the glass substrate for a panel was pulled up and dried at about 50° C. to finally provide a white polymer dispersion-type liquid crystal film having a thickness of 8 μm.

Another conductive transparent substrate was put on and brought to close contact with the liquid crystal film surface of the panel, and a dc voltage of 20 V was applied. As a result, the liquid crystal film became transparent, and returned to a white color when the application of the voltage was stopped. Therefore, it was confirmed that a polymer dispersion-type liquid crystal film was prepared.

EXAMPLE 4

10 Parts of a liquid crystal material for PDLC (trade name No. BL009 manufactured by , Merck, Limited) was added to an aqueous acrylic resin solution comprising 55 parts of a cationic acrylic resin, 15 parts of ethyl cellosolve, 3 parts of isopropyl alcohol, about 1 part of acetic acid (a neutralizing agent) and 1,000 parts of pure water, and the mixture was strongly stirred to prepare an emulsion of a liquid crystal.

The emulsion was placed in an electrodeposition bath. A platinum plate was used as a positive electrode, and a 0.1 mm-thick stainless steel plate having a smooth surface as a main electrode for electrodeposition was used as a negative electrode. The surface of the main electrode plate had an electrodeposition region pattern of a liquid crystal material previously formed by using an electrical insulating photoresist according to a conventional method. Then, a commercially available silicone resin solution for use in peeling purposes was sufficiently diluted, and the main electrode plate was immersed in the solution to prepare a thin peeling layer having no effect on the electrodeposition. A polymer dispersion-type liquid crystal film having a thickness of 10 μm was prepared by using this main electrode in the same manner as that described above.

Separately, a photosensitive acrylic resin adhesive was spin-coated to a thickness of 0.3 μm on an ITO surface of a glass plate having an ITO transparent conductive layer of the same pattern as the above-described main electrode, and the above-described main electrode plate already provided with a polymer dispersion-type liquid crystal film was correctly located in relation to the ITO pattern on the surface of the glass and brought to close contact with the ITO pattern, and the main electrode plate at its back surface was evenly pressed by means of a rubber roller. Thereafter, the main electrode was peeled off to transfer the electrodeposited polymer dispersion-type liquid crystal film onto the surface of the glass.

After the transfer of the film onto the surface of the glass, a test was conducted in the same manner as that of Example 3. As a result, it was found that the object was attained. Further, the main electrode could be repeatedly used.

EXAMPLE 5

A nonionic micell forming agent comprising a ferrocene derivative (surfactant; trade name: Ferrocenyl PEG manufactured by Dojin Kagaku K.K) (3 mM/1000 ml) was added to an aqueous solution in which the following capsule containing a liquid crystal had been dispersed, and ultrasonic stirring was sufficiently conducted to prepare a dispersion. Then, electrolysis was conducted by using a glass plate provided with an ITO film prepared in Example 1 as a main electrode, a platinum plate as a counter electrode and a saturated calomel electrode as a reference electrode and adding LiBr (0.05 mM) as a supporting electrolyte under conditions of a voltage of +0.9 V and an electrolysis time of one hour to form a liquid crystal capsule film on the surface of the ITO film. The above-described capsule was produced as follows.

10 Parts of polymethylenepolyphenyl isocyanate (millionate MR-400) was dissolved in 50 parts of a nematic liquid crystal (E-44 manufactured by Merck, Limited). Then, the solution was added to an aqueous solution of polyoxyethyleneoctadecylamine (Nymeen S-215 manufactured by Nippon Oils & Fats Co., Ltd.), and ultrasonic dispersion was conducted. The resultant emulsion was allowed to stand at 60° C. for 5 hr to provide a liquid crystal microcapsule.

EXAMPLE 6

A solution of 5 parts of styrene and 1 part of divinylbenzene dissolved in 20 parts of a nematic liquid crystal (E44 manufactured by Merck, Limited) was added to a solution of 1 part of New Frontier A229E (manufactured by Dai-ichi Kogyo Seiyaku Co., ltd.) as a reactive surfactant and 0.3 part of New Frontier C-1615 (manufactured by Dai-ichi Kogyo Seiyaku Co., ltd.) as a cationic reactive surfactant dissolved in 2,000 parts of pure water, and ultrasonic dispersion was conducted.

Then, the dispersion was maintained at 50° C. under a nitrogen stream, 0.01 part of potassium persulfate and 0.01 part of sodium hydrogensulfite were added thereto, and the mixture was allowed to stand for 6 hr to conduct polymerization, thereby preparing an ionized capsule (cationic). Electrodeposition was conducted by using the resultant emulsion in the same manner as that of Example 3 to prepare a polymer dispersion-type liquid crystal film, and it was found that electrodeposition coating could be conducted by addition of an ionic substance through a reaction.

EXAMPLE 7

A liquid crystal emulsion having a weight ratio of a continuous phase to a dispersed phase of 200:20 was produced through the use of a membrane emulsification system manufactured by Ise Chemicals Corporation.

| | |
|---|---|
| Dispersed phase: nematic liquid crystal (E-44 manufactured by BDH) | 18 parts |
| Methyl methacrylate | 2 parts |
| Azobisisobutyronitrile | 0.05 part |

Continuous phase: 5% aqueous solution of polyvinyl alcohol (KP-06 manufactured by Nippon Synthetic Chemical Industry Co., ltd.)

Porous glass: MPG manufactured by Ise Chemicals Corporation; pore diameter=0.27 μm Inline pressure: 2.85 to 2.95 kgf/cm$^2$ Inline flow rate: 0.8 m/sec The resultant emulsion was heated at 70° C. for 6 hr without stirring to provide a microcapsule containing a liquid crystal. The particle site distribution of the microcapsule was measured. As a result, the particle size distribution was similar to one shown in FIG. 3A.

The above-described microcapsule was separated by. centrifugation to prepare a coating solution for electrodeposition coating having the following composition.

| | |
|---|---|
| The above microcapsule | 40 parts |
| Methacrylic acid/butyl methacrylate copolymer | 5 parts |
| Triethylamine | 1.4 parts |
| Ethanol | 30 parts |
| Water | 200 parts |

The above-described coating solution was placed in an electrodeposition bath, and the system was energized at 20 V for 10 sec to conduct electrodeposition. The resultant coating was dried at 60° C. for one hour to prepare a liquid crystal/polymer composite film having a thickness of 10 μm. The film was sandwiched between other PET films provided with ITO to prepare a cell.

A change in the light transmission of the cell showed that the cell was excellent in both the contrast and sharpness.

EXAMPLE 8

The following oil phase and water phase were stirred by means of a homogenizer at 5,000 rpm for 10 min to prepare an emulsion.

| | |
|---|---|
| Oil phase | |
| Nematic liquid crystal (BL-010 manufactured by Merck, Limited) | 200 parts |
| Black dichroic dye (S-428 manufactured by Mitsui Toatsu Chemicals, Inc.) | 4 parts |
| Methyl methacrylate | 20 parts |
| Azobisisobutyronitrile | 0.4 part |
| Water phase | |
| Polyvinyl alcohol (KP-06 manufactured by Nippon Synthetic Chemicals Industry Co., Ltd.) | 20 parts |
| Water | 980 parts |

The above-described emulsion was heated at 70° C. for 6 hr to complete an encapsulation.

[Electrodeposition Coating]

A coating solution having the following composition was prepared.

| | |
|---|---|
| The above liquid crystal capsule dispersion | 100 parts |
| Acrylic resin for electrodeposition | 6 parts |
| Water-soluble melamine resin | 2 parts |
| Triethylamine | 200 parts |
| Ethanol | 1.4 parts |
| Water | 12 parts |
| Organic pigment | 2 parts |

The above-described coating solution was used as an electrodeposition bath, and electrodes to which an identical color is to be given was selected from ITO electrodes on a glass plate patterned in a stripe form, and a voltage of 20 V was applied for 30 sec through the use of the selected electrodes as an anode. After the engergization, the electrode substrate was pulled up from the electrodeposition bath and washed with water and dried and cured at 80° C. for one hour to form a 10 μm thick colored liquid crystal dispersion film on an electrode to which the voltage was applied.

Repetition of the above-described step of electrodepositon-curing enabled a liquid crystal dispersion film of three colors, i.e., R, G and B, to be formed in a strip form.

[Preparation of Panel and Confirmation of Operation]

The liquid crystal dispersion film thus produced was sandwiched between counter electrode substrates patterned in a stripe form in such a manner that the stripes cross each other at right angles to prepare a panel. Each picture element of the panel exhibited a black color when no voltage was applied, and respective colors of R, G and B when a voltage was applied.

In this panel, although the color could be identified without use of any back light, the provision of a back light enabled a brighter and more vivid color to be displayed. There was substantially no dependency of the display upon the visible angle, and a clear display could be observed at every angles.

EXAMPLE 9

A liquid crystal emulsion having a weight ratio of a continuous phase to a dispersed phase of 200:20 was produced through the use of a film emulsification system manufactured by Ise Chemicals Corporation.

| | |
|---|---|
| Dispersed phase: nematic liquid crystal (E-44 manufactured by BDH) | 18 parts |
| Methyl methacrylate | 2 parts |
| Azobisisobutyronitrile | 0.05 part |

Continuous phase: 5% aqueous solution of polyvinyl alcohol.(KP-06 manufactured by Nippon Synthetic Chemical Industry Co., ltd.)

Porous glass: MPG manufactured by Ise Chemicals Corporation; pore diameter=0.27 μm Inline pressure: 2.85 to 2.95 kgf/cm$^2$ Inline flow rate: 0.8 m/sec The resultant emulsion was heated at 70° C. for 6 hr without agitation to provide a microcapsule containing a liquid crystal.

The above-described microcapsule was separated by centrifugation to prepare a coating solution for electrodeposition coating having the following composition.

| | |
|---|---|
| The above microcapsule | 90 parts |
| Anionic acrylic resin | 9 parts |
| Triethylamine | 1.8 parts |
| Ethanol | 18 parts |
| Water | 880 parts |

The above-described coating solution was placed in an electrodeposition bath, and the system was energized at 30 V for 10 sec through the use of a glass plate provided with a patterned ITO as a positive electrode and a counter electrode comprising platinum having the same shape and area as the ITO while maintaining the electrode interval at 1 cm. The coating was dried at 60° C. for one hour. The resultant composite film was a homogeneous liquid crystal/polymer composite film free from a protrusion in the peripheral portion of the film and having the same shape and area as the ITO pattern.

The anionic acrylic resin used in this Example was synthesized as follows.

Synthesis Method

The following composition was prepared and allowed to react in a separable flask equipped with an agitator and a reflex condenser in a nitrogen stream at 60° C. for 6 hr to synthesize an anionic acrylic resin.

| Methacrylic acid | 10 parts |
|---|---|
| Methyl methacrylate | 11 parts |
| Butyl acrylate | 38 parts |
| 2-Ethoxyethanol | 89 parts |
| Azobisisobutyronitrile | 1.2 parts |

After the completion of the reaction, the polymer was isolated and purified by a reprecipitation method.

Reference Example 3

Electrodeposition was conducted in the same manner as that of Example 1, except that linear electrode was used as a counter electrode instead of an ITO pattern. In the resultant liquid crystal/polymer composite film, protrusion was observed around the film.

EXAMPLE 10 (Method wherein no dispersion in PVA is conducted)

An emulsion B having a weight ratio of a continuous phase to a dispersed phase of 200:40 was produced through the use of a film emulsification system manufactured by Ise Chemicals Corporation.

| Dispersed phase: E-44 manufactured by BDH | 40 g |
|---|---|
| Continuous phase: methacrylic acid/methyl methacrylate copolymer | 5 g |
| Triethylamine | 1.4 g |
| Water | 184 g |
| Ethanol | 10 g |

Porous glass: MPG manufactured by Ise Chemicals Corporation; pore diameter=0.37 $\mu$m Inline pressure: 2.75 to 2.85 kgf/cm$^2$ The particle size distribution of the emulsion was measured. As a result, the particle size distribution was narrow.

The above-described emulsion coating solution was placed in an electrodeposition bath, and the system was energized at room temperature and a voltage of 20 V for 30 sec through the use of a glass substrate provided with ITO as an anode and a platinum plate as an anode to conduct electrodeposition on the anode. The glass substrate provided with ITO was pulled up, washed with water and dried at about 60° C. for one hour to provide a liquid crystal/polymer composite film having a thickness of 10 $\mu$m.

A sandwich cell was prepared in the same manner as that of Example 1. The change in the light transmission of the cell exhibited a high sharpness.

The methacrylic acid/butyl methacrylate copolymer used herein was synthesized as follows.

28 g of methacrylic acid and 82 g of butyl methacrylate were dissolved in 170 g of methyl cellosolve, 2 g of azoisobutyronitrile was added thereto, and the mixture was stirred at 60° C. for 6 hr to conduct a reaction. After the completion of the reaction, the reaction mixture was poured into a large amount of a mixed solution comprising water and methanol to provide a polymer. Further, reprecipitation was conducted in a methanol/water mixed solution, and the precipitate was dried in vacuum for purification.

COMPARATIVE EXAMPLE

Water contained in the emulsion used in Example 1 was removed under reduced pressure until the nonvolatile component content was 40% so that the viscosity became optimal, and the concentrate was subjected to screen printing on a PET film provided with ITO through the use of a metallic screen plate. The print was dried at 40° C. for 5 hr under reduced pressure to prepare a liquid crystal/polymer composite film. The film had a thickness of about 10 $\mu$m. However, edge protrusion having a height of 5 $\mu$m or more was observed around the peripheral portion, so that the lamination could not be satisfactorily conducted.

Another preferred embodiment of the invention will now be described.

In a preferred embodiment of the invention, the liquid crystal optical device includes a liquid crystal/polymer composite film including a matrix polymer composed mainly of a transparent ion dissociative resin having an acid value of 20 to 200 and, dispersed therein, a liquid crystal particle.

The acid value of the ionic matrix polymeris 20 to 200, preferably 50 to 200, still preferably 90 to 200. When it is less than 20, the solubility of the ionic matrix resin in an aqueous medium is unsatisfactory, while when it exceeds 200, the affinity of a coating, deposited by electrodeposition, for the medium becomes excessively high, raising a problem such as sagging.

The glass transition temperature should be 0° C. or above and is preferably 30 to 100° C. When the glass transition temperature in below 0° C., it is difficult to homogeneously grow the electrodeposited coating to a proper coating thickness and, at the same time, the coating strength is unsatisfactory. On the other hand, when the glass transition temperature exceeds 100° C., it is difficult to stop the growth of the electrodeposited coating in a proper coating thickness and, at the sane time, to prevent the rising around the coating.

The number average molecular weight is 10,000 to 200,000, preferably not less than 30,000. When the number average molecular weight is less than 10,000, the homogeneity of the coating is deteriorated. On the other hand, it exceeds 200,000, there arises a problem of insufficient solubility of the resin in the medium.

The percentage neutralization of the ionic matrix resin with an alkali is 0.2 to 3 equivalents, preferably 0.5 to 2 equivalents, still preferably 0.6 to 1.2 equivalents, per equivalent of the ionic dissociative group introduced into the matrix resin. When it is less than 0.2 equivalent, the solubility of the resin in the medium and other properties are unsatisfactory. On the other hand, when it exceeds 3 equivalents, problems arise such as redissolution of the coating due to an increase in evolution of gas, a deterioration in homogeneity of the coating due to occurrence of pin holes or the like, and the amount of an alkali included in the coating is large.

In the present invention, the ionic matrix resin is preferably a copolymer of at least one monomer represented by the formula $CH_2=C(R_1)-R_2-COOH$ wherein $R_1$ represents hydrogen or a methyl group and $R_2$ represents a hydrocarbon compound, having 2 to 10 carbon atoms, which may be absent or have a substituent, with at least one monomer represented by the formula $CH_2=C(R_1)-COOR_2$ wherein $R_1$ represents hydrogen or a methyl group and $R_2$ represents a hydrocarbon compound, having 2 to 10 carbon atoms, which may have a substituent. That is, the so-called "acrylic copolymer" is particularly preferred.

Preferred examples of the monomer represented by the formula $CH_2=C(R_1)-R_2-COOH$ include acrylic acid and methacrylic acid, and examples of the monomer represented by the formula $CH_2=C(R_1)-COOR_2$ include methyl, ethyl, propyl, butyl, pentyl, hexyl, hydroxyethyl and hydroxyhexyl esters of acrylic acid and methacrylic acid. The above monomers may be used alone or in the form of a mixture of two or more. In addition, the monomers may be copolymerized with a third copolymerizable monomer.

Ionic matrix resins having an acid value, a glass transition temperature, and a molecular weight preferred in the present invention may be obtained by varying the kind, common ratio, using the monomers in combination with a third monomer, using a chain transfer agent, and varying polymerization conditions and other conditions.

The liquid crystal dispersion composition for electrodeposition according to the present invention may be produced by dispersing or dissolving the above encapsulated lid crystal particle and the above ionic matrix resin (optionally containing a nonionic resin) in an aqueous medium and adding a suitable neutralizer to the dispersion or solution. Examples of the neutralizer include inorganic substances, such as potassium hydroxide and sodium hydroxide, and organic substances, such as triethylamine and diethylenetriamine.

The amount of the neutralizer used is 0.2 to 3 equivalents per equivalent of the carboxyl group when the ionic group of the ionic matrix resin is a carboxyl group.

The aqueous medium used for dispersing or dissolving the above encapsulated liquid crystal particle, ionic matrix resin and neutralizer is composed mainly of water, and in order to improve the solubility of the matrix resin and to prepare a smooth coating, it is also preferred to incorporate an organic solvent in the liquid crystal dispersion composition for electrodeposition (electrodeposition solution). Examples of the organic solvent used herein include alcohols, such as methanol, ethanol, and isopropanol, cellosolves, such as methyl cellosolve and ethyl cellosolve, and hydrophilic organic solvents, such as glycol and carbitol. If necessary, it is also possible to use hydrophobic solvents such as xylol and toluol.

Assistants usable in the present invention include surfactants for imparting the dispersion stability to the encapsulated liquid crystal particle and levelling agents and antifoaming agents for improving the smoothness of the coating.

The total solid content of the liquid crystal dispersion composition for electrodeposition according to the present invention, comprising the above components, is preferably in the rage of from about 5 to 40% by weight. When the solid content is less than 5% by weight, the liquid stability is poor, causing microcapsules to be unfavorably aggregated or rendering the homogeneity and other properties of the electrodeposited coating unsatisfactory. On the other hand, when the solid content exceeds 40% by weight, problems occur including that a large amount of liquid crystal particles are carried away to the outside of an electrodeposition bath at the time of pull-up of electrodes after electrodeposition.

The proportions of respective essential components based on the solid matter, when the amount of the encapsulated liquid crystal particle is 100 parts by weight, are about 5 to 50 parts by weight for the matrix resin and the above equivalent ratio for the neutralizer. If the amount of the encapsulated liquid crystal particle used is excessively small, the scattering, when the voltage is off, is insufficient and, at the same time, a large voltage is necessary for rendering the film transparent. On the other hand, when the amount of the encapsulated liquid crystal particle used is large, the regulation of the thickness of the electrodeposited coating becomes difficult.

In addition to ultrasonic dispersion, mechanical agitation and other methods may be used to disperse the encapsulated liquid crystal particle in an aqueous medium.

This preferred embodiment of the invention will now be explained with reference to the following Examples. "Part (s)" or "%" are by weight unless otherwise specified.

EXAMPLE 11

A liquid crystal emulsion, of which the weight ratio of continuous phase to dispersed phase is 200:20, was prepared under the following conditions using a film emulsification system manufactured by Ise Chemicals Corporation.

| Dispersed phase | Nematic liquid crystal (E-44 manufactured by BDH) | 18 parts |
|---|---|---|
| | Methyl methacrylate | 2 parts |
| | Azobisisobutyronitrile | 0.05 parts |
| Continuous phase | Polyvinyl alcohol (KP-06 manufactured by Nippon Synthetic Chemical Industry) | 5% aqueous solution |
| Porous glass | MPG manufacture by Ise Chemicals Corporation (pore diameter: 0.27 μm) | |
| In-pipe pressure | 2.85–2.95 kgf/cm$^2$ | |
| In-pipe flow | 0.8 m/sec | |

The resultant liquid-crystal emulsion, as such, was heated at 70° C. for 6 hr without agitation to prepare a microcapsule with a liquid crystal being included therein.

The above capsule was isolated by centrifugation, and an electrodeposition composition of the present invention was prepared according to the following formulation.

| Formulation of electrodeposition composition | |
|---|---|
| Microcapsule prepared described above | 90 parts |
| Anionic acrylic resin specified in Table 1 | 9 parts |
| Triethylamine | 2 parts |
| Ethanol | 18 parts |
| Water | 880 parts |

(Percentage neutralization = 100%)

Figure 7:
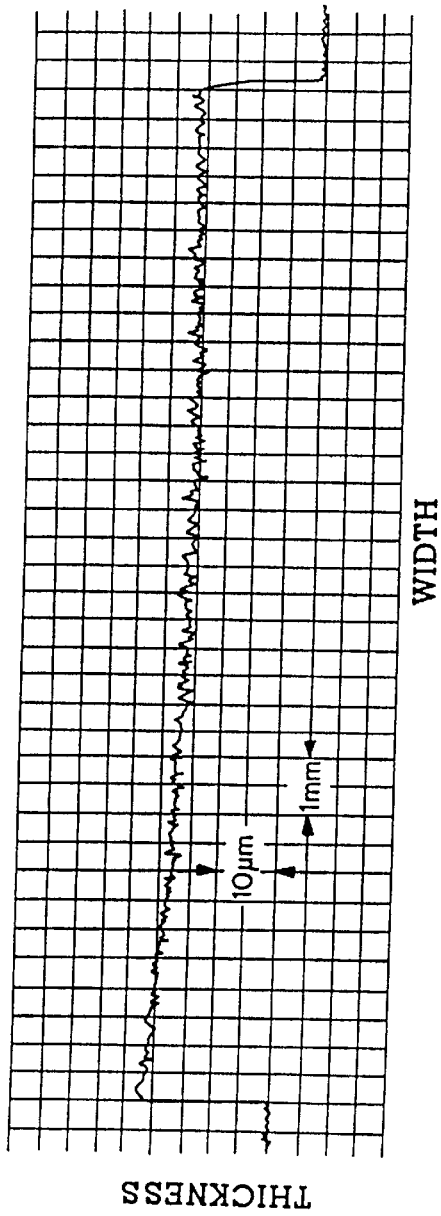
FIGS. 7a and 7b are graphs showing film thickness evenness.
Figure 7:
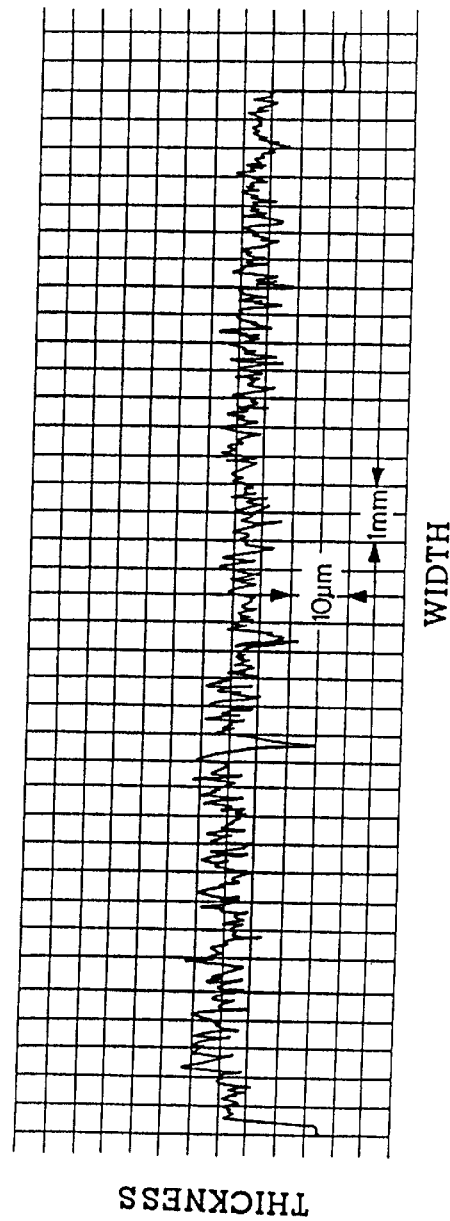

The above electrodeposition composition was placed in an electrodeposition bath. A glass substrate with ITO being patterned was used as an anode, while a counter electrode of platinum identical to ITO of the glass substrate in shape and area was used as a cathode. The system was energized under room temperature at 15 V for 30 sec with the electrode-to-electrode distance being kept at 1 cm, and the resultant composite film was dried at room temperature for 24 hr. The dried composite film, as shown in FIG. 7a, was a liquid crystal/polymer composite film free from rising around the periphery of the film, identical to the ITO pattern in shape and area, and having good evenness. The anionic acrylic resin (Sample No. 5 specified in Table 1 described below) used herein synthesized as follow.

Synthesis Method

A solution having the following composition was prepared and placed in a separable flask equipped with an agitator and a reflux condenser, and a polymerization reaction was allowed to proceed in a nitrogen stream at 60° C. for 6 hr to synthesize an anionic acrylic resin.

| Methacrylic acid | 17 parts |
|---|---|
| Methyl methacrylate | 20 parts |

-continued

| | |
|---|---|
| Butyl methacrylate | 70 parts |
| 2-Ethoxyethanol | 150 parts |
| Azobisisobutyronitrile | 2 parts |

After the completion of the reaction, the polymer was isolated and purified by the reprecipitation method.

In the above synthesis example, various properties of the isolated and purified polymer were determined by the following methods.

Acid Value:

The acid value was determined by dissolving a predetermined amount of the resin in a predetermined amount of ethanol or tetrahydrofuran, adding phenolphthalein as an indicator, and titrating the solution with a 1/10 N potassium hydroxide solution.

Glass Transition Point (Tg):

The glass transition point was determined by using a differential scanning calorimeter (DSC7) manufactured by Perkin-Elmer Corp.).

Number Average Molecular Weight (Mn):

The number average molecular weight was determined, in terms of a value converted into the molecular weight of standard polystyrene, by gel permeation chromatography (column used: Shodex KF-805, KF-803 and KF-802 manufactured by Showa Denko K.K.; and G2000H$_{XL}$, apparatus used: HLC-802A manufactured by Tosoh corporation).

Preparation of Panel and Performance Test

A counter electrode, which had been subjected to patterning identical to the electrodeposited substrate, was arranged in such a manner that the liquid crystal/polymer dispersed film prepared in Example 11 was sandwiched between the two substrates so an for the patterns to be perpendicular to each other, thereby preparing a panel. Each pixel of this panel was white then no voltage was applied, and turned transparent when a voltage was applied.

The provision of back light gave rise to a more bright and vivid change of opaque-transparent. Further, substantially no dependency upon the viewing angle was observed, and a clear display could be viewed from every angle.

COMPARATIVE EXAMPLE 1

The procedure of Example 11 was repeated, except that an electrodeposition composition was prepared according to the following formulation using an anionic acrylic resin of Sample No. 9 specified in Table 1 below instead of the anionic acrylic resin in Example 11.

| Formulation of electrodeposition composition | |
|---|---|
| Liquid crystal microcapsule used in Example 1 | 90 parts |
| Anionic acrylic resin (Sample No. 9) | 9 parts |
| Triethylamine | 1.4 parts |
| Ethanol | 18 parts |
| Water | 880 parts |

(Percentage neutralization = 100%)

Synthesis Method

A monomer composition solution was prepared according to the following formulation, the monomer composition solution was placed in a separable flask equipped with an agitator and a reflux condenser, and a polymerization reaction was allowed to proceed under a nitrogen stream at 60° C. for 6 hr to synthesize the anionic acrylic resin of

| sample No. 9. | |
|---|---|
| Methacrylic acid | 8.8 parts |
| Methyl methacrylate | 15 parts |
| Butyl methacrylate | 30 parts |
| 2-Ethoxyethanol | 150 parts |
| Azobisisobutyronitrile | 22 parts |

The resultant liquid crystal/polymer composite film, as shown in FIG. 7b, was poor in evenness of the film, so that it was difficult for the composite film, as such, to be laminated.

TABLE 1

| Sample No. | 1 | 2 | 3 | 4 | 5 | 6 | 7 | 8 | 9 | 10 |
|---|---|---|---|---|---|---|---|---|---|---|
| | | | | Monomer composition | | | | | | |
| Methacrylic acid | 10 | 10 | 17 | 40 | 17 | 17 | 18 | 18 | 8.8 | 18 |
| Methyl methacrylate | 11 | 18 | 0 | 92 | 20 | 20 | 30 | 30 | 15 | 30 |
| Butyl methacrylate | 0 | 0 | 89 | 0 | 70 | 70 | 60 | 60 | 30 | 60 |
| Butyl acrylate | 38 | 30 | 0 | 92 | 0 | 0 | 0 | 0 | 0 | 0 |
| Butylmercaptan | 0 | 0 | 0 | 0 | 0 | 0 | 0 | 6.8 | 0 | 1.7 |
| Azoisobutyronitrile | 1.2 | 1.2 | 2 | 4.5 | 2 | 1 | 2 | 8.8 | 22 | 2.2 |

TABLE 1-continued

| | | | | Property values | | | | | | |
|---|---|---|---|---|---|---|---|---|---|---|
| Tg[1] (° C.) | -13 | 4 | 34 | 20 | 48 | 48 | 55 | 55 | 55 | 55 |
| Tg[2] (° C.) | -34 | -21 | 59 | 30 | 63 | 75 | 87 | 36 | 33 | 54 |
| Acid value | 114 | 143 | 105 | 124 | 123 | 109 | 91 | 103 | 88 | 101 |
| Mn (×10³) | 39 | 37 | 51 | 39 | 51 | 72 | 52 | 4 | 6.6 | 10 |
| | | | | Composition for electrodeposition | | | | | | |
| Neutralizer | Triethylamine | Triethylamine | Triethylamine | Triethylamine | Triethylamine | Triethylamine | Triethylamine | Triethylamine | Triethylamine | Triethylamine |
| Percentage neutralization | 100% | 100% | 100% | 100% | 100% | 100% | 100% | 100% | 100% | 100% |

| Sample No. | 11 | 12 | 13 | 14 | 15 | 16 | 17 | 18 |
|---|---|---|---|---|---|---|---|---|
| | | | | Monomer composition | | | | |
| Methacrylic acid | 1 | 5 | 10 | 10 | 11 | 22 | 20 | 30 |
| Methyl methacrylate | 37 | 30 | 52 | 41 | 0 | 0 | 0 | 76 |
| Butyl methacrylate | 0 | 0 | 60 | 0 | 0 | 0 | 0 | 68 |
| Butyl acrylate | 26 | 29 | 0 | 0 | 109 | 90 | 83 | 0 |
| Butylmercaptan | 0 | 0 | 0 | 0 | 0 | 0 | 0 | 0 |
| Azoisobutyronitrile | 1.3 | 1.3 | 2.4 | 1 | 2.4 | 2.2 | 2.1 | 3.5 |
| | | | | Property values | | | | |
| Tg[1] (° C.) | 19 | 13 | 59 | 110 | -44 | -32 | 54 | 70 |
| Tg[2] (° C.) | 30 | 8 | 48 | 105 | -39 | -24 | 61 | 78 |
| Acid value | 12 | 56 | 57 | 108 | 82 | 148 | 178 | 109 |
| Mn (×10³) | 45 | 51 | 40 | 51 | 55 | 60 | 52 | 58 |
| | | | | Composition for electrodeposition | | | | |
| Neutralizer | Triethylamine | Triethylamine | Triethylamine | Triethylamine | Triethylamine | Triethylamine | Triethylamine | Triethylamine |
| Percentage neutralization | 100% | 100% | 100% | 100% | 100% | 100% | 100% | 100% |

Note* 1) Calculated value $$1/T_g = W_1/T_1 + W_2/T_2 + W_3/T_3 \ldots$$

Wherein Tg: glass transition temperature (absolute temperature) of the copolymer;
Wx: wt % wet of each monomer and
Tx: glass transition temperature (absolute temperature) of each homopolymer.
2) Found Value EXAMPLES 12 to 18

The procedure of Example 11 was repeated, except that matrix resins of sample Nos. 3, 4, 6, 2, 10, 12, 13, 17 and 18 specified in Table 1 were used instead of the ionic matrix resin in Example 11. The results were the same as those of Example 11.

COMPARATIVE EXAMPLE 2 to 5

The procedure of Example 1 was repeated, except that matrix resins of sample Nos. 1, 2, 8, 11, 14, 15 and 16 specified in Table 1 were used instead of the ionic matrix resin in Example 1. As a result, for sample Nos. 1, 2, 15 and 16, the film thickness was remarkably unsatisfactory, and for sample Nos. 8, 11 and 14, the results were the same as those of Comparative Example 1.

What is claimed is:

1. A method for producing a liquid crystal optical device comprising the steps of:
   (1) providing on an electrically insulating substrate a material comprised of a conductive film divided into a plurality of regions and thus constituting a plurality of electrodes;
   (2) providing on said material a polymer dispersion-type liquid crystal containing a color;
   (3) selectively applying a voltage to an electrode to form a polymer dispersion-type liquid crystal layer by electrodeposition coating on the electrode to which a voltage is applied; and
   (4) repeating said steps (2) and (3) to separately coat multi-color polymer dispersion-type liquid crystal layers on respective electrodes.

2. A method of producing a liquid crystal optical device, comprising the steps of:
   (1) forming a predetermined resist pattern on a conductive substrate;
   (2) forming a polymer dispersion-type liquid crystal layer on an opening of the resist by electrodeposition coating of a polymer dispersion-type liquid crystal containing a color;
   (3) removing part of the resist in a predetermined pattern to expose the electrode; and
   (4) forming a polymer dispersion-type liquid crystal layer having a hue different from the hue of the polymer dispersion-type liquid crystal layer applied in step (2) on the exposed electrode.

* * * * *